(12) United States Patent
Hwang

(10) Patent No.: US 12,737,600 B2
(45) Date of Patent: Sep. 15, 2026

(54) NEUROMORPHIC DEVICE

(71) Applicant: SAMSUNG ELECTRONICS CO., LTD., Suwon-si (KR)

(72) Inventor: Youngnam Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 982 days.

(21) Appl. No.: 17/983,058

(22) Filed: Nov. 8, 2022

(65) Prior Publication Data

US 2023/0153589 A1 May 18, 2023

(30) Foreign Application Priority Data

Nov. 15, 2021 (KR) ........................ 10-2021-0156563
Feb. 22, 2022 (KR) ........................ 10-2022-0022755
Sep. 21, 2022 (KR) ........................ 10-2022-0119296

(51) Int. Cl.

| | |
|---|---|
| ***G06N 3/063*** | (2023.01) |
| ***G06N 3/048*** | (2023.01) |
| ***G06N 3/0495*** | (2023.01) |
| ***G06N 3/065*** | (2023.01) |
| ***G06N 3/08*** | (2023.01) |

(52) U.S. Cl.

CPC ........... *G06N 3/063* (2013.01); *G06N 3/0495* (2023.01); *G06N 3/065* (2023.01); *G06N 3/048* (2023.01); *G06N 3/08* (2013.01)

(58) Field of Classification Search

CPC ...... G06N 3/063; G06N 3/0495; G06N 3/048; G06N 3/08; G06N 3/065
USPC .......................................................... 708/501
See application file for complete search history.

(56) References Cited

U.S. PATENT DOCUMENTS

| | | | |
|---|---|---|---|
| 10,180,820 | B2 | 1/2019 | Buchanan et al. |
| 10,387,771 | B2 | 8/2019 | Judd et al. |
| 10,540,420 | B2 | 1/2020 | Kalsi et al. |
| 10,678,509 | B1 | 6/2020 | Settle et al. |

(Continued)

FOREIGN PATENT DOCUMENTS

| | | |
|---|---|---|
| KR | 10-2114356 B1 | 5/2020 |
| KR | 10 2021 0111004 A | 9/2021 |

OTHER PUBLICATIONS

Communication dated Nov. 26, 2025 issued by the Korean Intellectual Property Office in Korean Patent Application No. 10-2022-0119296.

(Continued)

*Primary Examiner* — Khai M Nguyen
(74) *Attorney, Agent, or Firm* — Sughrue Mion, PLLC

(57) ABSTRACT

A neuromorphic device includes a plurality of cell tiles, each of the plurality of cell tiles including a cell array including a plurality of memory cells storing weights of a neural network, a row driver connected to the plurality of memory cells through a plurality of row lines, and cell analog-digital converters (ADCs) connected to the plurality of memory cells through a plurality of column lines, and a controller configured to select, form the plurality of cell tiles, a plurality of valid cell tiles storing the weights, execute a neural network-based arithmetic operation based on the plurality of valid cell tiles, and redundantly store weights of a first layer among a plurality of layers included in the neural network in a plurality of first valid cell tiles that are divided into a plurality of first tile groups.

20 Claims, 21 Drawing Sheets

(56) References Cited

U.S. PATENT DOCUMENTS

| | | | | |
|---|---|---|---|---|
| 10,891,991 | B2 | 1/2021 | Akerib | |
| 10,977,001 | B2 | 4/2021 | Lin et al. | |
| 11,003,446 | B2 | 5/2021 | Langhammer et al. | |
| 11,049,013 | B1 | 6/2021 | Duong et al. | |
| 11,087,208 | B2 | 8/2021 | Yakopcic et al. | |
| 11,227,030 | B2 | 1/2022 | Simpson | |
| 11,269,629 | B2 | 3/2022 | Zhang et al. | |
| 11,494,630 | B2 * | 11/2022 | Jeon | G06N 3/065 |
| 11,531,898 | B2 * | 12/2022 | Le Gallo-Bourdeau | G06N 3/063 |
| 2018/0095930 | A1 | 4/2018 | Lu et al. | |
| 2018/0174033 | A1 | 6/2018 | Davies | |
| 2018/0189645 | A1 | 7/2018 | Chen et al. | |
| 2019/0042252 | A1 | 2/2019 | Kaul et al. | |
| 2019/0340493 | A1 | 11/2019 | Coenen et al. | |
| 2020/0134461 | A1 | 4/2020 | Chai et al. | |
| 2020/0349420 | A1 | 11/2020 | Ovsiannikov et al. | |
| 2020/0410333 | A1 | 12/2020 | Das et al. | |
| 2021/0150313 | A1 | 5/2021 | Roy et al. | |
| 2021/0173662 | A1 | 6/2021 | Leenstra et al. | |
| 2021/0192324 | A1 | 6/2021 | Srivastava | |
| 2021/0271453 | A1 | 9/2021 | Morie et al. | |
| 2021/0326702 | A1 | 10/2021 | Cheng | |
| 2021/0357748 | A1 | 11/2021 | Shin et al. | |
| 2022/0076110 | A1 | 3/2022 | Shao et al. | |
| 2022/0147826 | A1 | 5/2022 | Xiao et al. | |

OTHER PUBLICATIONS

Communication dated Mar. 30, 2023, issued by the European Patent Office in counterpart European Application No. 22207034.4.

Jacob et al., "Quantization and Training of Neural Networks for Efficient Integer-Arithmetic-Only Inference," arXiv:1712.05877v1 [cs.LG] Dec. 2017, Total 14 pages.

* cited by examiner

| LAYER | TRF | TRL | TCF | TCL |
|---|---|---|---|---|
| L1 | 1 | 10 | 1 | 5 |
| L2 | 11 | 15 | 1 | 15 |
| L3 | 6 | 10 | 6 | 15 |
| ... | ... | ... | ... | ... |

| LAYER | TRF | TRL | TCF | TCL | PI | PW |
|---|---|---|---|---|---|---|
| L1 | 1 | 10 | 1 | 5 | 3 | 3 |
| L2 | 11 | 15 | 1 | 15 | 4 | 4 |
| L3 | 16 | 10 | 6 | 15 | 3 | 3 |
| ... | ... | ... | ... | ... | ... | ... |

| LAYER | TRF | TRL | TCF | TCL |
|---|---|---|---|---|
| L1 | 1 | 4 | 1 | 10 |
| L2 | 1 | 4 | 1 | 4 |
| L3 | 9 | 10 | 1 | 4 |
| ... | ... | ... | ... | ... |

FIG. 10

| LAYER | TRF | TRL | TCF | TCL |
|---|---|---|---|---|
| L1 | 1 | 4 | 1 | 10 |
| L2 | 1 | 4 | 11 | 12 |
| L3 | 1 | 4 | 13 | 13 |
| ... | ... | ... | ... | ... |

FIG. 11

| LAYER | TRF | TRL | TCF | TCL | PI | OFFSET |
| --- | --- | --- | --- | --- | --- | --- |
| L1 | 1 | 2 | 1 | 6 | 2 | 0 |
| L1 | 3 | 4 | 1 | 6 | 2 | 2 |
| L2 | 5 | 6 | 1 | 4 | 3 | 0 |
| L3 | 5 | 6 | 5 | 6 | 3 | 0 |
| ... | ... | ... | ... | ... | ... | ... |

FIG. 13

| LAYER | TRF | TRL | TCF | TCL | PI | OFFSET |
|---|---|---|---|---|---|---|
| L1 | 1 | 2 | 1 | 6 | 1 | 0 |
| L1 | 3 | 4 | 1 | 6 | 1 | 1 |
| L1 | 5 | 6 | 1 | 6 | 1 | 2 |
| L1 | 7 | 8 | 1 | 6 | 1 | 3 |
| L2 | 1 | 4 | 7 | 8 | 3 | 0 |
| L3 | 3 | 6 | 7 | 8 | 3 | 0 |
| ... | ... | ... | ... | ... | ... | ... |

FIG. 16

| LAYER | 0 X Z2 | 1 X Z2 | 2 X Z2 | 3 X Z2 | ... | 31 X Z2 |
|---|---|---|---|---|---|---|
| L1 | 0 | 4 | 8 | 12 | ... | 124 |
| L2 | 0 | 3 | 6 | 9 | ... | 93 |
| L3 | 0 | 4 | 8 | 12 | ... | 124 |
| ... | ... | ... | ... | ... | ... | ... |

NEUROMORPHIC DEVICE

CROSS-REFERENCE TO RELATED APPLICATION(S)

This application is based on and claims priority to Korean Patent Application No. 10-2021-0156563 filed on Nov. 15, 2021, Korean Patent Application No. 10-2022-0022755 filed on Feb. 22, 2022, and Korean Patent Application No. 10-2022-0119296 filed on Sep. 21, 2022, in the Korean Intellectual Property Office, the disclosures of which are incorporated herein by reference in their entireties.

BACKGROUND

1. Field

One or more example embodiments of the disclosure relate to a neuromorphic device.

2. Description of Related Art

A neuromorphic device is a semiconductor device made by simulating an information processing method of the brain in a manner in which an artificial nervous system is produced at the neuron level, and may implement a deep learning neural network, neuromorphic computing, and the like. The neuromorphic device may perform, for example, a multiply and accumulate (MAC) operation that multiplies input data by a weight and adds the multiplication results, and may include a plurality of memory cells that store the weight in a form of data to perform the operation. Various methods for improving the performance of the neuromorphic device and at the same time reducing power consumption have been proposed.

SUMMARY

Provided is a neuromorphic device capable of improving versatility, an arithmetic operation speed, and the degree of integration, and reducing power consumption by dynamically allocating a plurality of cell tiles to a plurality of layers according to the number of nodes included in each of the plurality of layers in a neural network, a connection structure of the nodes, and the like, redundantly storing a weight of one layer, and inputting some bits of input data in a divided manner.

Additional aspects will be set forth in part in the description which follows and, in part, will be apparent from the description, or may be learned by practice of the presented embodiments.

According to an aspect of an example embodiment, a neuromorphic device may include a plurality of cell tiles, each of the plurality of cell tiles including a cell array including a plurality of memory cells storing weights of a neural network, a row driver connected to the plurality of memory cells through a plurality of row lines, and cell analog-digital converters (ADCs) connected to the plurality of memory cells through a plurality of column lines, and a controller configured to select, form the plurality of cell tiles, a plurality of valid cell tiles storing the weights, execute a neural network-based arithmetic operation based on the plurality of valid cell tiles, redundantly store weights of a first layer among a plurality of layers included in the neural network in a plurality of first valid cell tiles that are divided into a plurality of first tile groups, input a lower bit of input data input to the first layer to a first tile group of the plurality of first tile groups, and input an upper bit of the input data to a second tile group of the plurality of first tile groups during the neural network-based arithmetic operation.

According to an aspect of an example embodiment, a neuromorphic device may include a plurality of cell tiles, each of the plurality of cell tiles including a cell array including a plurality of memory cells, a row driver connected to the plurality of memory cells through a plurality of row lines, and cell ADCs connected to the plurality of memory cells through a plurality of column lines and configured to convert cell currents read through the plurality of column lines into digital cell data, a controller configured to define a plurality of first tile groups respectively including at least two of the plurality of cell tiles, and store, in each of the plurality of first tile groups, weights of a first layer included in a trained neural network based on the weights of the first layer being received, a layer buffer configured to receive, from the controller, and store matching information of the plurality of first tile groups, precision information of input data input to the first layer, and precision information of the weights of the first layer, and a plurality of offset shifters configured to execute a multiplication operation on the digital cell data output from each of the plurality of cell tiles.

According to an aspect of an example embodiment, a neuromorphic device a plurality of cell tiles, each of the plurality of cell tiles including a cell array including a plurality of memory cells storing weights of a neural network, a row driver connected to the plurality of memory cells through a plurality of row lines, and cell ADCs connected to the plurality of memory cells through a plurality of column lines and configured to convert cell currents read through the plurality of column lines into digital cell data, a layer buffer configured to store matching information between a plurality of layers included in the neural network and a plurality of valid cell tiles of the plurality of cell tiles storing the weights, and a controller configured to select the plurality of valid cell tiles among the plurality of cell tiles based on the matching information, and execute a neural network-based arithmetic operation based on the plurality of valid cell tiles.

BRIEF DESCRIPTION OF DRAWINGS

The above and other aspects, features, and advantages of certain example embodiments of the present disclosure will be more apparent from the following description taken in conjunction with the accompanying drawings, in which:

FIGS. 10 and 11 are diagrams illustrating layer buffers included in the neuromorphic device according to an example embodiment of the disclosure;

FIG. 13 is a diagram illustrating a layer buffer included in the neuromorphic device according to an example embodiment of the disclosure;

FIG. 16 is a diagram illustrating layer buffers included in the neuromorphic device according to an example embodiment of the disclosure;

DETAILED DESCRIPTION

Hereinafter, exemplary embodiments of the disclosure will now be described in detail with reference to the accompanying drawings.

Figure 1A:
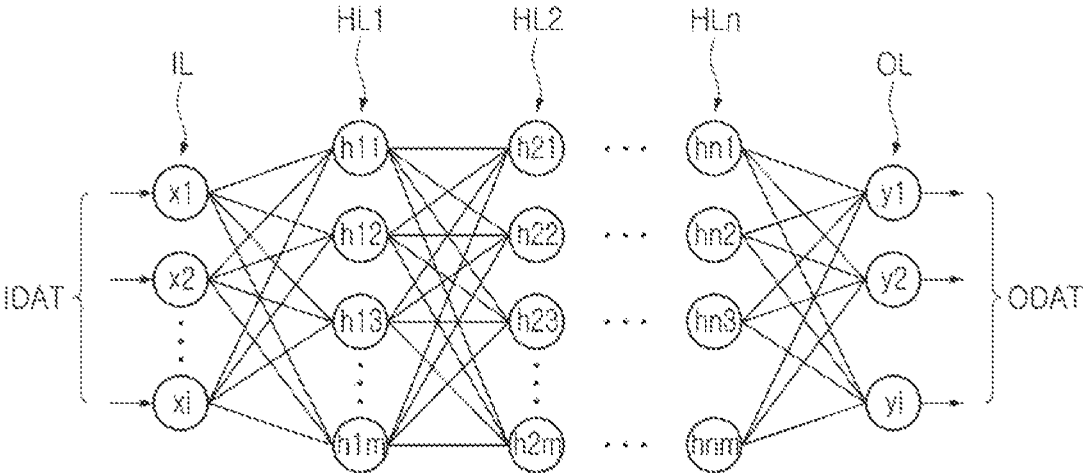
FIGS. 1A and 1B are diagrams illustrating a neural network implemented by a neuromorphic device according to an example embodiment of the disclosure.
Figure 1B:
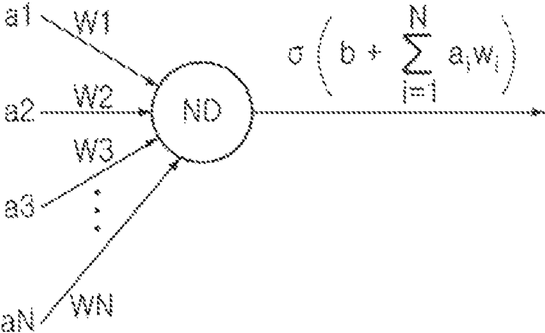

FIGS. 1A and 1B are diagrams illustrating a neural network implemented by a neuromorphic device according to an example embodiment of the disclosure.

Referring to FIG. 1A, a network structure of a general neural network may include an input layer IL, a plurality of hidden layers HL1 to HLn, and an output layer OL. The input layer IL may include i input nodes x1 to xi (where i is a natural number), and vector input data IDAT having a length of i may be input to each input node.

The input data IDAT may be input to hidden layers including n hidden layers HL1 to HLn (n is a natural number), and each of the hidden layers HL1 to HLn may include hidden nodes. For example, a first hidden layer HL1 may include m hidden nodes hl1 to hlm (m is a natural number), and an n-th hidden layer HLn may include m hidden nodes hn1 to hnm.

In an example embodiment illustrated in FIG. 1A, an example in which each of the hidden layers HL1 to HLn includes the same number of hidden nodes has been described, but the numbers of hidden nodes included in the respective hidden layers are not necessarily the same as each other. For example, at least some of the hidden layers HL1 to HLn may include different numbers of hidden nodes.

The output layer OL may include j output nodes y1 to yj (where j is a natural number) corresponding to classes. For example, the output layer OL may output, as output data ODAT, a result (for example, a score or a class score) for each class with respect to the input data IDAT.

The neural network illustrated in FIG. 1A may include a branch between two nodes indicated as a straight line between the nodes, and a weight used in each branch. Nodes included in one layer do not have to be connected to each other, and nodes included in different layers may be completely or partially connected.

Each node of FIG. 1A may receive an output of a previous node and execute an arithmetic operation, and may output an arithmetic operation result to a subsequent node. Each node may compute a value to be output by applying an input value to a specific function, for example, a nonlinear function.

In general, the structure of the neural network may be variously modified, and when the structure of the neural network is determined, weights for branches between nodes may be set to appropriate values by using a data set whose correct answer is already known. The data set whose correct answer is already known and which is used to determine the weights is referred to as training data, and a process of determining the weights by using the training data may be referred to as learning.

FIG. 1B illustrates an example embodiment of an arithmetic operation executed in one node ND among the nodes included in the neural network of FIG. 1A. Referring to FIG. 1B, in a case where n inputs A1 to An are provided to one node ND, the node ND may multiply n inputs A1 to An by n weights W1 to Wn corresponding thereto, respectively, add the multiplication results, and add an offset b to the sum. Further, the node ND may generate one output value z by applying a value reflecting the offset to a specific function $\sigma$.

In a case where one of the layers included in the neural network according to the example embodiment illustrated in FIG. 1A includes m nodes ND illustrated in FIG. 1B, output values of the one layer may be obtained as in Equation (1).

$$Z = W * A \tag{1}$$

In Equation (1), W may represent weights corresponding to all branches included in the one layer, and may be expressed in a form of an m×n matrix. A may represent n inputs A1 to An received by the one layer, and may be expressed in a form of an n×1 matrix. Z may represent m outputs Z1 to Zm output from the one layer, and may be expressed in a form of an m×1 matrix.

Figure 2:
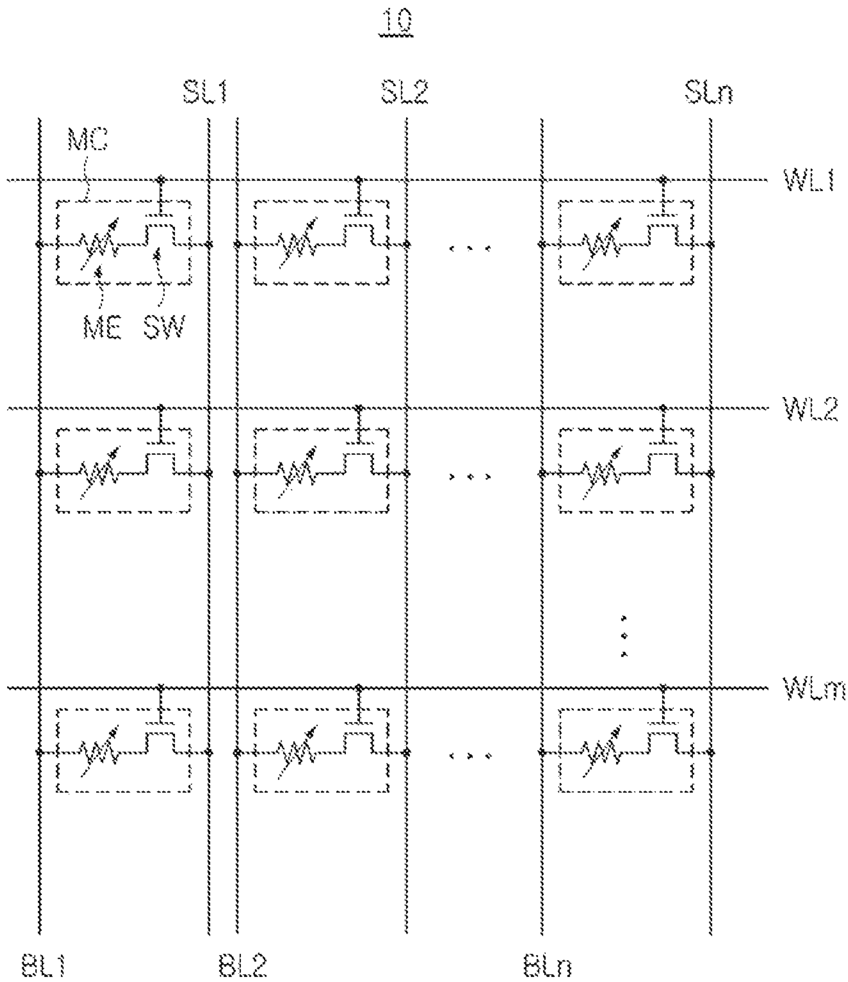
FIG. 2 is a diagram illustrating a cell array included in the neuromorphic device according to an example embodiment of the disclosure.

FIG. 2 is a diagram illustrating a cell array included in the neuromorphic device according to an example embodiment of the disclosure.

Referring to FIG. 2, a cell array 10 may include a plurality of row lines, a plurality of column lines, and a plurality of memory cells MC. Each of the plurality of memory cells MC may include a switch element SW and a memory element ME. For example, the plurality of row lines may include a plurality of word lines WL1 to WLm, and the plurality of column lines may include a plurality of bit lines BL1 to BLn and a plurality of source lines SL1 to SLn.

The memory element ME included in each of the plurality of memory cells MC may be a variable resistance element, and a resistance value of the memory element ME may be determined by a voltage, a current, or the like, applied through the plurality of word lines WL1 to WLm, the plurality of bit lines BL1 to BLn, and the plurality of source lines SL1 to SLn. For example, a turn-on voltage capable of turning on the switch element SW is input to a selected word line and a predetermined bias voltage is input to a selected bit line and a selected source line, so that a resistance value of the memory element ME included in a selected memory cell may be increased or decreased. Data "0" or "1" is stored in the selected memory cell according to the resistance value of the memory element ME, and a relationship between data stored in the selected memory cell and the resistance value of the memory element ME may vary, depending on example embodiments.

When a neural network to be implemented by a neuromorphic device including the cell array 10 is determined, weights corresponding to a plurality of layers included in the neural network may be converted into binary data and stored in the memory cells MC. When inference using the neural network is started, a voltage or a current corresponding to input data may be input through the plurality of source lines SL1 to SLn while sequentially activating the plurality of word lines WL1 to WLm, and the voltage or the current may be detected through the plurality of bit lines BL1 to BLn. Accordingly, an arithmetic operation in which one of n inputs A1 to An is multiplied by one of n weights W1 to Wn as described above with reference to FIG. 1B may be executed. In a case where all the plurality of layers included in the neural network are implemented in a form of the cell array 10 as described above, a neuromorphic device that stores data and executes an arithmetic operation may be implemented.

Each of the plurality of memory cells MC may be implemented by a resistive memory cell such as a phase change random access memory (PRAM) cell, a resistance random access memory (RRAM) cell, a magnetic random access memory (MRAM) cell, or a ferroelectric random access memory (FRAM) cell. According to an example embodiment, the memory element ME may include a phase-change material whose crystalline state changes according to the amount of current. The phase-change material may include various kinds of materials. For example, a compound of two elements such as GaSb, InSb, InSe, $Sb_2Te_3$, or GeTe, a compound of three elements such as GeSbTe, GaSeTe, InSbTe, $SnSb_2Te_4$, or InSbGe, and a compound of four elements such as AgInSbTe, (GeSn)SbTe, GeSb(SeTe), or $Te_{81}Ge_{15}Sb_2S_2$ may be used. According to another example embodiment, the memory element ME may include perovskite compounds, transition metal oxides, magnetic materials, ferromagnetic materials, or antiferromagnetic materials. However, the material included in the memory element ME is not limited to the above-described materials.

The cell array 10 has been described as having a two-dimensional array structure in the example embodiment described with reference to FIG. 2, but the structure of the cell array 10 is not necessarily limited thereto. For example, the cell array may have a three-dimensional vertical array structure. The structure of the plurality of memory cells MC may also be variously modified depending on example embodiments.

Figure 3:
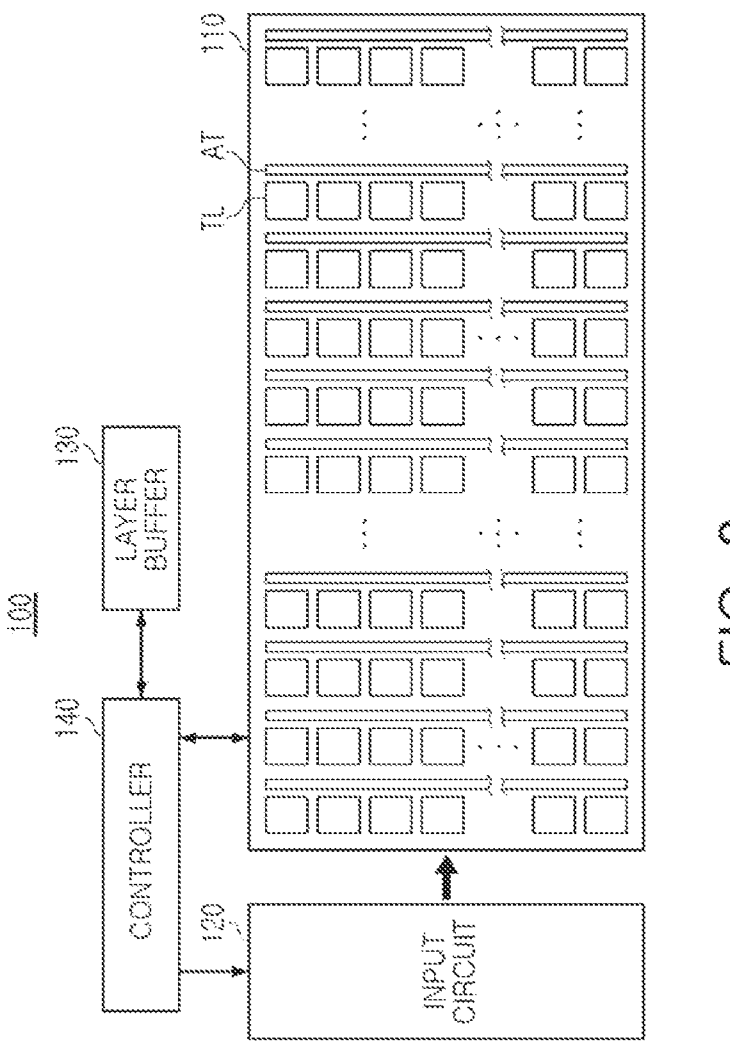
FIG. 3 is a diagram illustrating a neuromorphic device according to an example embodiment of the disclosure.

FIG. 3 is a diagram illustrating a neuromorphic device according to an example embodiment of the disclosure.

Referring to FIG. 3, a neuromorphic device 100 according to an example embodiment of the disclosure may include a cell region 110, an input circuit 120, a layer buffer 130, a controller 140, and the like. The input circuit 120 may include an activation function circuit or the like. The activation function circuit may activate input data and execute a function corresponding to an activation function such as a rectified linear unit (ReLU) activation function.

A plurality of cell tiles TL and a plurality of adder trees AT connected to the plurality of cell tiles TL may be arranged in the cell region 110. For example, the plurality of cell tiles TL may be arranged in a matrix form. Each of the plurality of cell tiles TL may include a plurality of memory cells, and weights required for executing a neural network-based arithmetic operation may be stored in the plurality of memory cells.

As an example, the neural network may include a plurality of layers, and each of the plurality of layers may include at least one node. A weight may be allocated to a path connecting nodes between a pair of adjacent layers, and thus a multiply and accumulate (MAC) operation that multiplies data by the weight and adds the multiplication results may be executed while data is transmitted between the layers.

A part of the MAC operation may be executed in the plurality of cell tiles TL, and other parts of the MAC operation may be executed in the plurality of adder trees AT. According to some example embodiments, the plurality of cell tiles TL may be divided into a plurality of groups, and one adder tree AT may be connected to each of the plurality of groups. Referring to FIG. 3, two or more cell tiles TL arranged along the same column may be connected to one adder tree AT. In this case, the number of cell tiles TL included in the neuromorphic device 100 may be larger than the number of adder trees AT.

According to an example embodiment, weights corresponding to the nodes included in each of the plurality of layers may be dispersedly stored in two or more cell tiles TL. According to the structure of the neural network, at least one of the plurality of layers may include a large number of nodes. In this case, the number of weights to be stored in one cell tile TL increases, which may degrade performance of the neuromorphic device 100. According to an example embodiment of the disclosure, the weights of each of the plurality of layers may be dispersedly stored in two or more cell tiles TL to solve the above problem. For example, two or more cell tiles TL storing the weights included in one layer may be arranged adjacent to each other.

According to an example embodiment of the disclosure, a plurality of layers included in a trained neural network may be dynamically allocated to the plurality of cell tiles TL. In a case where a neural network to be implemented by the neuromorphic device 100 is changed, weights of each of a plurality of layers may be dynamically allocated to and stored in the plurality of cell tiles TL. Accordingly, one neuromorphic device 100 may support an arithmetic operation of various neural networks, and versatility of the neuromorphic device 100 may be improved.

Since the plurality of layers are dynamically allocated to the plurality of cell tiles TL, it may be necessary to store information regarding to which layer of the plurality of layers of the neural network each of the plurality of cell tiles TL is allocated. According to an example embodiment of the disclosure, the weights of each of the plurality of layers included in the trained neural network may be stored in some of the plurality of cell tiles TL by the controller 140. For example, each of the cell tiles TL that actually store the weights may be defined as a valid cell tile.

Further, the controller 140 may store, in the layer buffer 130, information regarding allocation of each of the plurality of cell tiles TL to the plurality of layers included in the neural network. For example, the controller 140 may store, in the layer buffer 130, matching information indicating positions of two or more cell tiles TL that dividedly store the weights of each of the plurality of layers.

When a neural network-based arithmetic operation is started in the neuromorphic device 100, the controller 140 may select valid cell tiles storing weights of the first layer based on the matching information stored in the layer buffer

130 and may input input data to the valid cell tiles. Data output from the valid cell tiles may be added in the adder trees AT connected to the valid cell tiles, and the adder trees AT may output arithmetic operation data corresponding to an output of the first layer. The controller 140 may input the arithmetic operation data output from the adder trees AT to valid cell tiles storing weights of the second layer. By repeating the above process, the neuromorphic device 100 may execute the neural network-based arithmetic operation. According to an example embodiment, when an arithmetic operation result corresponding to one layer included in the neural network is output from the cell region 110, the controller 140 may input the arithmetic operation result to the activation function circuit of the input circuit 120 to activate the arithmetic operation result, and then input the activated arithmetic operation result to valid cell tiles corresponding to the next layer. The weights of the trained neural network may be floating-point type data, whereas the memory cells of each of the plurality of cell tiles TL may store fixed-point type data or integer type data. Accordingly, the floating-point type weights may be quantized and converted into fixed-point type or integer type weights, and then stored in the plurality of cell tiles TL. Similarly, the input data input to the neural network may be floating-point data, and thus the input data may also be converted into fixed-point type or integer type data and input to valid cell tiles among the plurality of cell tiles TL.

The weights and input data converted into fixed-point type or integer type data may be N-bit data, and the number of bits of the weights and the number of bits of the input data may be defined as precision. As the number of bits of the weights and the number of bits of the input data increase, the precision increases, and as a result of which accuracy of the arithmetic operation is improved. However, power consumption and arithmetic operation load may increase, and a larger number of valid cell tiles may be required to store the weights.

Accordingly, the precision of the weights and the input data may be determined to be different depending on the neural network. Further, according to example embodiments, the weights and the input data may be converted into different precisions in some of a plurality of layers included in one neural network. According to an example embodiment of the disclosure, precision information applied to the weights of each of the plurality of layers included in the neural network and the input data may be stored in the layer buffer 130. Accordingly, the valid cell tiles whose number is optimized for the structure of the neural network, the weights included in each of the plurality of layers, and the input data may be selected to store the weights, and the neural network-based arithmetic operation may be executed.

Further, according to an example embodiment of the disclosure, weights included in at least one of the plurality of layers included in the neural network may be stored redundantly in a plurality of tile groups. For example, weights included in a first layer among the plurality of layers may be redundantly stored in two or more first tile groups respectively including the same number of valid cell tiles. In other words, the weights included in the first layer may be stored in each of the first tile groups.

When the neural network-based arithmetic operation is executed in the neuromorphic device 100, the controller 140 may divide input data to be input to the first layer according to the number of bit digits and input the divided input data to each of the first tile groups. For example, in a case where the input data is N-bit data, some bits corresponding to lower bits may be input to one of the first tile groups, and the remaining bits corresponding to upper bits may be input to another one of the first tile groups.

For example, in a case where the input data is 4-bit data and the weights of the first layer are redundantly stored in two first tile groups, two lower bits of the input data may be input to one of the two first tile groups, and two upper bits of the input data may be input to the other one of the two first tile groups. As a result, an arithmetic operation speed of the neuromorphic device 100 may be improved.

Figure 4:
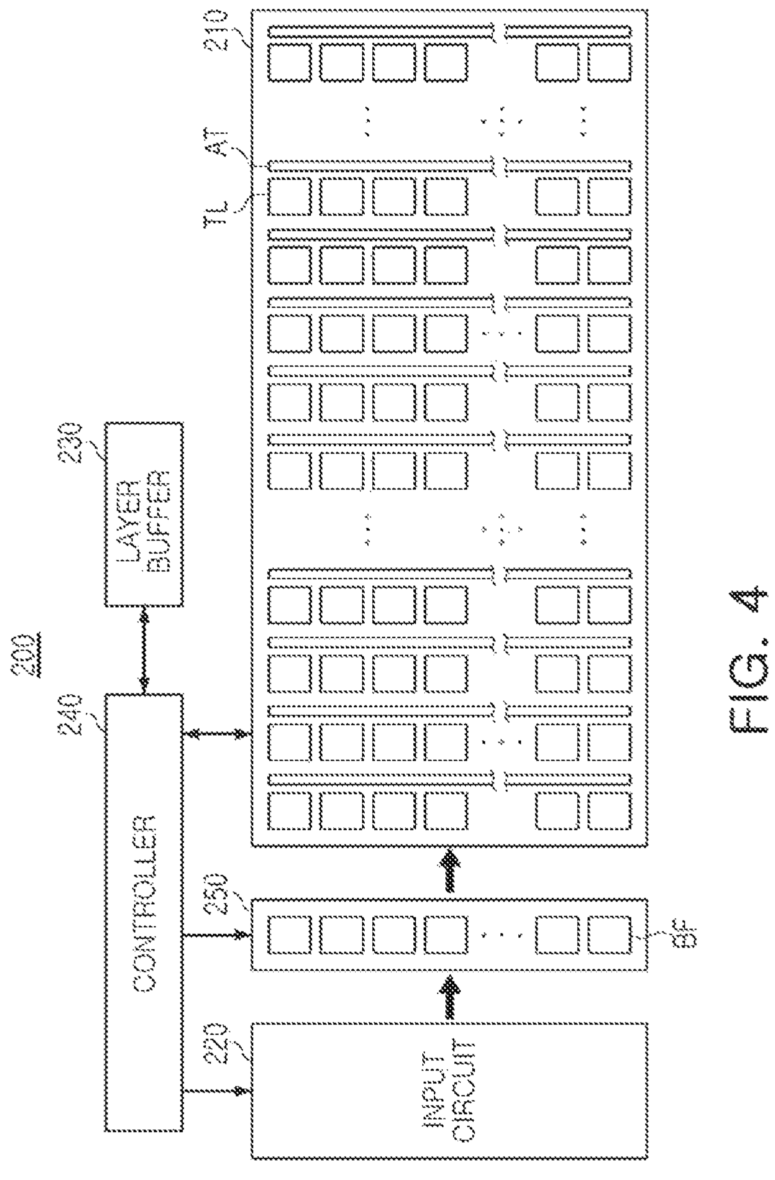
FIG. 4 is a diagram illustrating a neuromorphic device according to an example embodiment of the disclosure.

FIG. 4 is a diagram illustrating a neuromorphic device according to an example embodiment of the disclosure. Referring to FIG. 4, a neuromorphic device 200 may include a cell region 210, an input circuit 220, a layer buffer 230, a controller 240, a buffer circuit 250, and the like. Operations of the cell region 210, the input circuit 220, the layer buffer 230, and the controller 240 may be similar to those described above with reference to FIG. 3. For example, a plurality of cell tiles TL may be disposed in the cell region 210, and weights of a trained neural network may be stored in at least some valid cell tiles among the plurality of cell tiles TL.

The buffer circuit 250 may include a plurality of buffers BF, and the plurality of buffers BF may temporarily store input data activated by the input circuit 220 and transmit the input data to some valid cell tiles executing an arithmetic operation among a plurality of valid cell tiles. For example, the controller 240 may operate only some buffers BF connected to some valid cell tiles executing an arithmetic operation among the plurality of buffers BF by referring to matching information stored in the layer buffer 230. Data of other unselected buffers BF may be set to 0.

As described above, the neural network may include a plurality of layers, and adder trees AT may be allocated to two or more cell tiles TL corresponding to each of the plurality of layers. For example, one adder tree AT may be allocated to two or more cell tiles TL. At least one of the adder trees AT may be configured to determine an arithmetic operation result output from cell tiles TL corresponding to one layer.

Figures 5A, 5B:
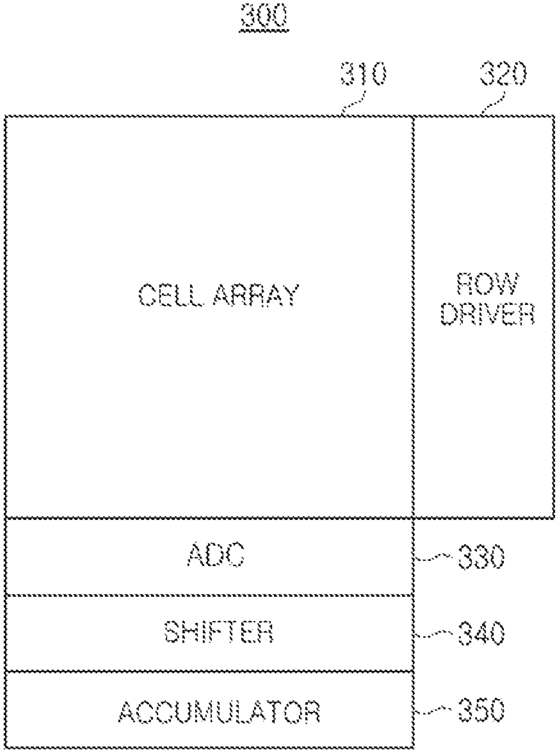
FIGS. 5A and 5B are diagrams illustrating an operation of the neuromorphic device according to an example embodiment of the disclosure.

FIGS. 5A and 5B are diagrams illustrating an operation of the neuromorphic device according to an example embodiment of the disclosure.

Referring to FIG. 5A, each cell tile 300 of a plurality of cell tiles may include a cell array 310 in which a plurality of memory cells are arranged, a row driver 320 connected to the cell array 310 through a plurality of row lines, an analog-to-digital converter (ADC) 330 connected to the cell array 310 through a plurality of column lines, a shifter 340, an accumulator 350, and the like. As described above with reference to FIG. 2, the row driver 320 may be connected to the plurality of memory cells through a plurality of word lines, and the ADC 330 may be connected to the plurality of memory cells through a plurality of bit lines and a plurality of source lines. The ADC 330 may include a plurality of cell ADCs, and the number of the plurality of cell ADCs may be equal to the number of the plurality of bit lines and the number of the plurality of source lines.

The plurality of memory cells may store an N-bit weight converted into fixed-point type or integer type data. When the row driver 320 inputs input data through the plurality of row lines, cell currents may be output through the plurality of column lines, and the cell currents may correspond to a result of multiplying the input data by the weight. The plurality of cell ADCs included in the ADC 330 may convert the cell currents output through the plurality of column lines into digital cell data and output the digital cell data.

The shifter 340 may execute a multiplication operation on the digital cell data. For example, the shifter 340 may execute a multiplication operation on the digital cell data by executing an operation of shifting each digital cell data according to the precision that determines the number of bits of each of the weights and the input data. For example, in a case where the number of bits of the input data is defined as pi, the number of bits of the weights is defined as pw, the number of bit digits of the input data is defined as i, and an index according to the order of each of the plurality of column lines is expressed as col, the shifter 340 may shift each digital cell data by (i+col % pw) times.

The accumulator 350 may accumulate outputs of the shifter 340. For example, in a case where the number of bit digits of the input data is (pi−1), and (col % pw), which is modulo of the index col of the column line and the number pw of bits of the weights is equal to (pw−1), the accumulator 350 may output data and reset stored data.

FIG. 5B illustrates the layer buffer included in the neuromorphic device according to an example embodiment of the disclosure. Referring to FIG. 5B, the layer buffer according to an example embodiment of the disclosure may store matching information indicating positions of valid cell tiles storing the weights of each of the plurality of layers included in the neural network.

For example, a row-direction start position TRF and a column-direction start position TCF of valid cell tiles storing weights of a first layer L1 may each be 1. A row-direction end position TRL and a column-direction end position TCL of the valid cell tiles storing the weights of the first layer L1 may be 10 and 5, respectively. In summary, the number of valid cell tiles storing the weights of the first layer L1 may be 50, and the valid cell tiles may be arranged in a matrix form of 10 rows and 5 columns.

In a case of valid cell tiles storing weights of a second layer L2, a row-direction start position TRF may be 11, and a column-direction start position TCF may be 1. A row-direction end position TRL and a column-direction end position TCL may each be 15. Accordingly, the number of valid cell tiles storing the weights of the second layer L2 may be 75, and the valid cell tiles storing the weights of the second layer L2 may be arranged below the valid cell tiles storing the weights of the first layer L1.

In a case of valid cell tiles storing weights of a third layer L3, a row-direction start position TRF and a column-direction start position TCF may each be 6. A row-direction end position TRL may be 10, and a column-direction end position TCL may be 15. Accordingly, the number of valid cell tiles storing the weights of the third layer L3 may be 50, and the valid cell tiles storing the weights of the third layer L3 may be arranged on one side of the valid cell tiles storing the weights of the first layer L1 and above the valid cell tiles storing the weights of the second layer L2.

As described above, in a case where weights of a specific layer are redundantly stored, information indicating whether or not the weights are redundantly stored may be additionally stored in the layer buffer, which will be described later.

Figures 6A, 6B:
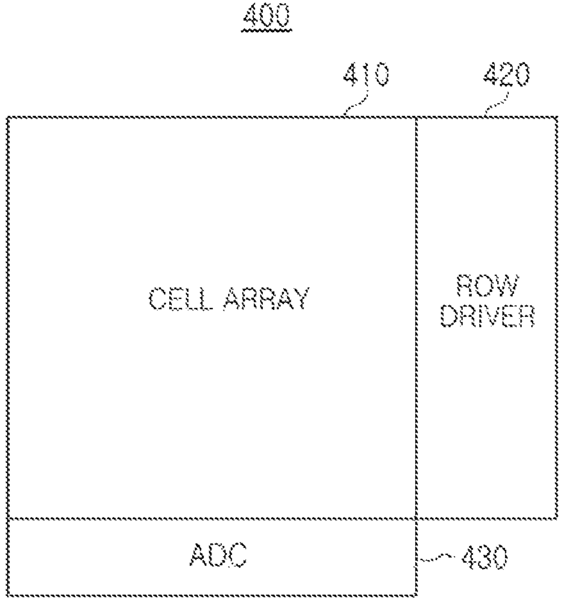
FIGS. 6A and 6B are diagrams illustrating an operation of the neuromorphic device according to an example embodiment of the disclosure.

FIGS. 6A and 6B are diagrams illustrating an operation of the neuromorphic device according to an example embodiment of the disclosure.

First, referring to FIG. 6A, each cell tile 400 of a plurality of cell tiles may include a cell array 410 in which a plurality of memory cells are arranged, a row driver 420 connected to the cell array 410 through a plurality of row lines, an ADC 430 connected to the cell array 410 through a plurality of column lines, and the like. Structures and operations of the cell array 410, the row driver 420, and the ADC 430 may be similar to those of the example embodiment described above with reference to FIG. 5A.

According to the example embodiment illustrated in FIG. 6A, each of the plurality of cell tiles does not have to include the shifter and the accumulator. Instead, according to the example embodiment illustrated in FIG. 6A, the shifter and the accumulator may be connected to an output terminal of an adder tree included in the neuromorphic device. Operations of the shifter and the accumulator may be similar to those described with reference to FIG. 5A.

However, as described above, the input data and the weights may be quantized with different precisions depending on a neural network to be implemented by the neuromorphic device. Further, even in one neural network, different precisions may be applied to at least some of the plurality of layers. Accordingly, in a case where each of the plurality of cell tiles does not include the shifter and the accumulator as in the example embodiment illustrated in FIG. 6A, precision information applied to the neural network and/or each of the plurality of layers may be stored in the layer buffer.

FIG. 6B illustrates the layer buffer included in the neuromorphic device according to an example embodiment of the disclosure. Referring to FIG. 6B, the layer buffer according to an example embodiment of the disclosure may store matching information indicating positions of valid cell tiles storing the weights of each of the plurality of layers included in the neural network, and precision information indicating precision applied to each of the plurality of layers. The precision information may include weight precision information PW indicating precision of the weights included in each of the plurality of layers, and input precision information PI indicating precision of the input data input to each of the plurality of layers.

Referring to FIG. 6B, the number and arrangement of valid cell tiles storing the weights of each of the first to third layers L1 to L3 may be the same as those described above with reference to FIG. 5B. Referring to FIG. 6B, the weight precision information PW and the input precision information PI of each of the first to third layers L1 to L3 may be stored in the layer buffer.

In the neuromorphic device, the shifter and the accumulator connected to the output terminal of the adder tree may be operated according to the weight precision information PW and the input precision information PI stored in the layer buffer. For example, the controller of the neuromorphic device may select some of the valid cell tiles by referring to the matching information stored in the layer buffer to execute a MAC operation corresponding to one of the plurality of layers and input the input data. Digital cell data output from the valid cell tiles selected by the controller may be input to the adder tree, and an output of the adder tree may be input to the shifter. The controller may control a multiplication operation of the shifter and an accumulate operation of the accumulator by referring to the weight precision information PW and the input precision information PI stored in the layer buffer.

Figure 7:
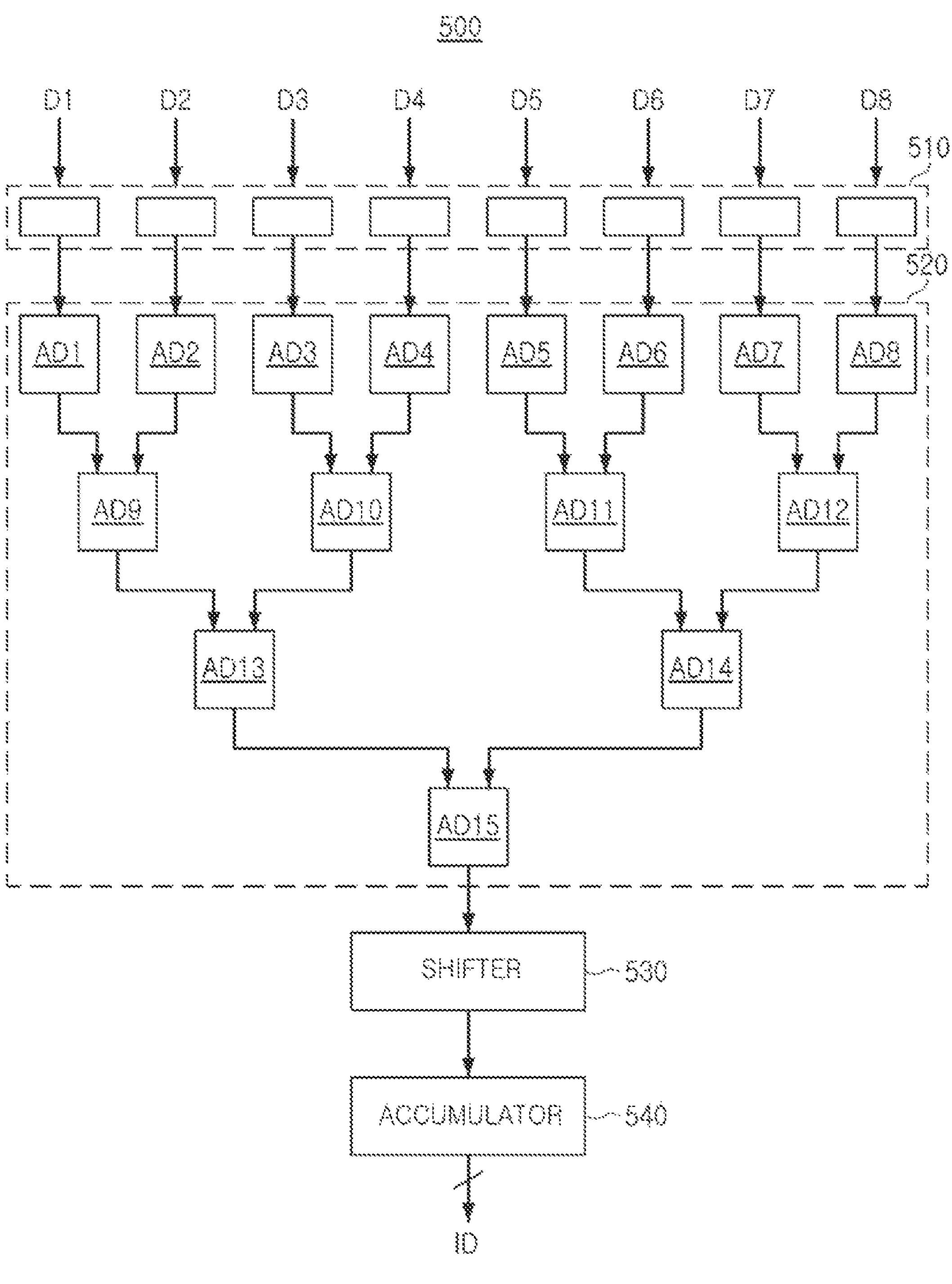
FIG. 7 is a diagram illustrating a structure of an adder tree included in a neuromorphic device according to an example embodiment of the disclosure.

FIG. 7 is a diagram illustrating a structure of an adder tree included in a neuromorphic device according to an example embodiment of the disclosure.

Referring to FIG. 7, a neuromorphic device 500 according to an example embodiment of the disclosure may include an adder buffer 510, an adder tree 520, a shifter 530, an accumulator 540, and the like. A plurality of adder buffers included in the adder buffer 510 may receive a plurality of data D1 to D8. For example, the plurality of data D1 to D8 may be digital cell data output from valid cell tiles actually storing weights among a plurality of cell tiles included in the neuromorphic device 500. Data of an adder buffer connected to a valid cell tile that does not participate in a neural network-based inference operation among the valid cell tiles may be set to 0. Accordingly, an arithmetic operation result of the adder tree 520 may not be affected.

The adder tree 520 may include a plurality of adders AD1 to AD15, and each of the plurality of adders AD1 to AD15 may be one of a full adder and a half adder. The plurality of adders AD1 to AD15 may be arranged along a plurality of stages and may be connected to each other.

The shifter 530 and the accumulator 540 may be connected to an output terminal of the adder tree 520. The shifter 530 and the accumulator 540 may execute a multiplication operation and an accumulate operation based on the precision of the weights and the precision of the input data applied to a layer corresponding to the valid cell tiles outputting the digital cell data D1 to D8 to the adder buffer 510. Output data ID of the accumulator 540 may be provided as the input data to valid cell tiles corresponding to the next layer.

Figure 8:
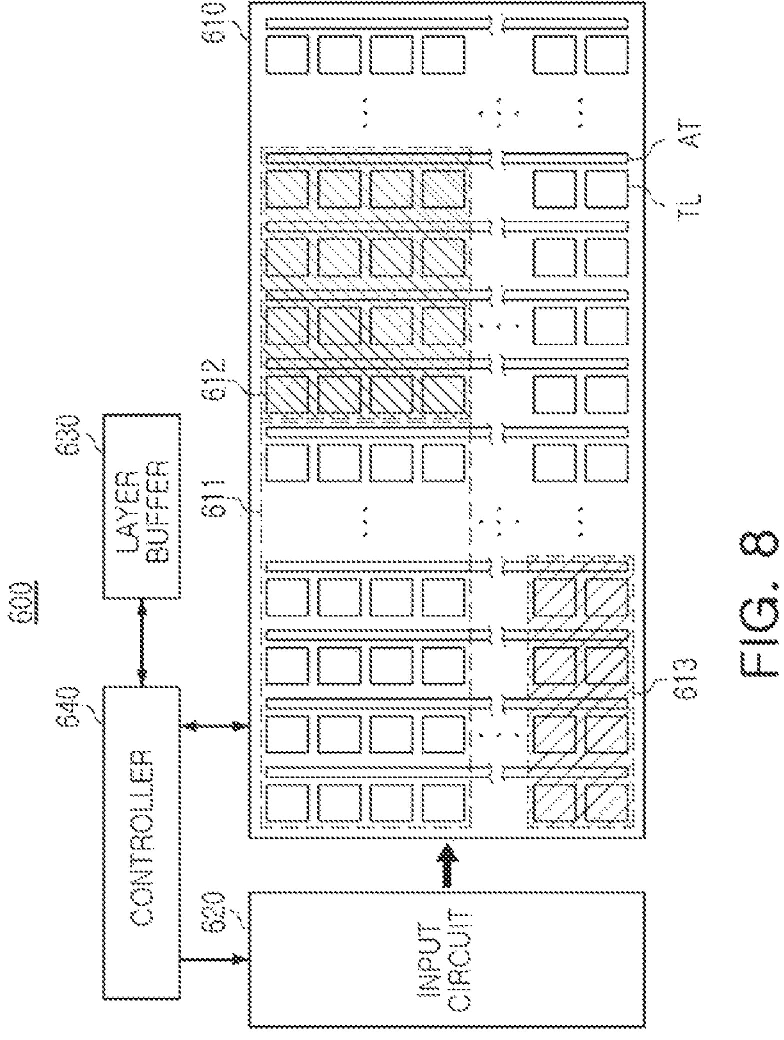
FIGS. 8 and 9 are diagrams illustrating a neuromorphic device according to an example embodiment of the disclosure.
Figure 9:
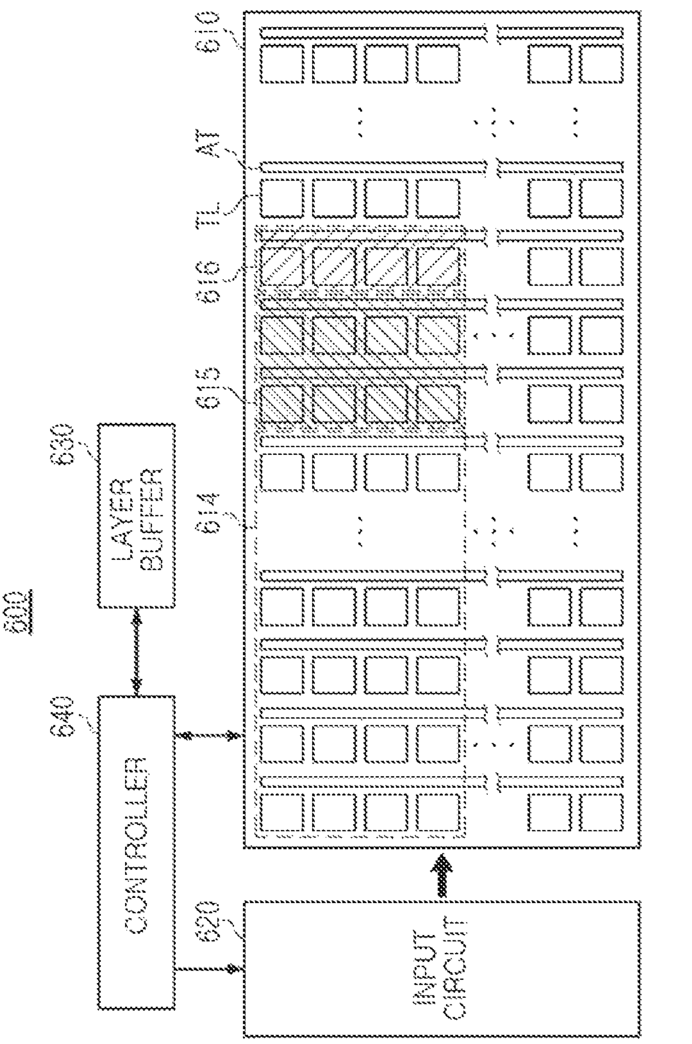

FIGS. 8 and 9 are diagrams illustrating a neuromorphic device according to an example embodiment of the disclosure.

Referring to FIGS. 8 and 9, a neuromorphic device 600 according to an example embodiment of the disclosure may include a cell region 610, an input circuit 620, a layer buffer 630, a controller 640, and the like. A plurality of cell tiles TL and a plurality of adder trees AT may be arranged in the cell region 610, each of the plurality of cell tiles TL may include a plurality of memory cells, and weights required for executing a neural network-based arithmetic operation may be stored in the plurality of memory cells.

According to an example embodiment, weights corresponding to nodes included in each of the plurality of layers may be dispersedly stored in two or more cell tiles TL. According to the structure of the neural network, at least one of the plurality of layers may include a large number of nodes. In this case, the number of weights to be stored in one cell tile TL increases, which may degrade performance of the neuromorphic device 600. According to an example embodiment of the disclosure, the weights of each of the plurality of layers may be dispersedly stored in two or more cell tiles TL to solve the above described performance degradation. For example, two or more cell tiles TL storing the weights included in one layer may be arranged adjacent to each other.

According to the example embodiments illustrated in FIGS. 8 and 9, when weights of a trained neural network are input to the neuromorphic device 600, the controller 640 may select valid cell tiles required for storing the weights in the cell region 610 and store the weights in the selected valid cell tiles. For example, the number of valid cell tiles may vary depending on the structure of the trained neural network (e.g., the number of nodes, a connection structure of the nodes, a precision applied in a process of quantizing the weights, etc.).

When the weights are stored in the valid cell tiles, the controller 640 may store, in the layer buffer 630, matching information of a plurality of layers included in the neural network and a plurality of valid cell tiles, precision information of the weights the input data corresponding to each of the plurality of layers, and the like. By storing the matching information and the precision information in the layer buffer 630, the controller 640 may accurately input the input data of each layer into valid cell tiles storing the weights of the corresponding layer, and execute an inference operation.

Referring to FIG. 8, first valid cell tiles storing weights included in a first layer of the neural network may be included in a first tile group 611 of the cell region 610. Second valid cell tiles storing weights included in a second layer may be arranged in a second tile group 612 of the cell region 610 and third valid cell tiles storing weights included in a third layer may be arranged in a third tile group 613 of the cell region 610.

A part of a MAC operation executed in the inference operation of the neural network may be executed in the plurality of cell tiles TL, and other parts of the MAC operation may be executed in the plurality of adder trees AT. As illustrated in FIG. 8, one adder tree AT may be connected to some cell tiles TL adjacent to each other in the column direction in the cell region 610. However, according to an example embodiment, one adder tree AT may be allocated to valid cell tiles storing weights included in each layer of the neural network. For example, first adder trees connected to the first valid cell tiles arranged in the first tile group 611 may generate output data of nodes included in the first layer. Second adder trees connected to the second valid cell tiles arranged in the second tile group 612 may generate output data of nodes included in the second layer, and third adder trees connected to the third valid cell tiles arranged in the third tile group 613 may generate output data of nodes included in the third layer.

According to an example embodiment of the disclosure, a plurality of layers included in a trained neural network may be dynamically allocated to the plurality of cell tiles TL. For example, referring to FIG. 9, a position and an area of at least one of a first tile group 614 in which first valid cell tiles are arranged, a second tile group 615 in which second valid cell tiles are arranged, or a third tile group 616 in which third valid cell tiles are arranged may be different from those in the example embodiment illustrated in FIG. 8.

As illustrated in FIGS. 8 and 9, the number and arrangement of valid cell tiles storing the weights of each layer may vary even in one neuromorphic device 600, because a neural network to be implemented by the neuromorphic device 600 varies. Alternatively, the number and arrangement of valid cell tiles storing the weights of each layer may vary also in a case where the weights vary due to additional learning even in a neural network having the same structure, or in a case where precision for inputting and storing the input data and the weights in the plurality of cell tiles TL varies.

According to an example embodiment of the disclosure, since the number and arrangement of valid cell tiles may dynamically vary depending on the structure of the neural network as well as the precision of the input data and the weights, one neuromorphic device 600 may support various neural networks. Therefore, there is no need to individually design and produce neuromorphic devices for supporting different neural networks, and versatility of the neuromorphic device 600 may be greatly improved.

Referring to FIGS. 8 and 9, the valid cell tiles storing the weights of each layer may be arranged in rectangular tile groups 611 to 616. According to an example embodiment of the disclosure, matching information for identifying each of the tile groups 611 to 616 in which the valid cell tiles storing the weights of each layer are arranged may be stored in the layer buffer 630, and the controller 640 may execute a neural network-based inference operation by referring to the matching information.

Since each of the tile groups 611 to 616 of the cell region 610 is set to have a rectangular shape, there may be a valid cell tile that does not store the weight in at least one of the tile groups 611 to 616, or there may be memory cells that do not store the weights in a valid cell tile according to an example embodiment. In this case, all data of the valid cell tile and memory cell that do not store the weight may be zero-padded.

The controller 640 may store the weights of each layer of the trained neural network in the valid cell tiles arranged in each of the rectangular tile groups 611 to 616 as illustrated in FIGS. 8 and 9. Accordingly, the matching information stored in the layer buffer 630 may be simplified, and the controller 640 may easily determine the number and positions of valid cell tiles storing the weights of each layer.

According to an example embodiment, adder buffers may be connected between the plurality of cell tiles TL and the plurality of adder trees AT. The adder buffers may store only digital cell data output from valid cell tiles storing the weights required for an arithmetic operation for a specific layer among the valid cell tiles included in each of the tile groups 611 to 616, and transmit the digital cell data to the plurality of adder trees AT.

For example, according to the example embodiment illustrated in FIG. 8, some of the valid cell tiles of the first tile group 611 may share the adder trees AT with the valid cell tiles of the third tile group 613. While an arithmetic operation corresponding to the first layer is executed, the adder buffers may select only digital cell data output from the valid cell tiles of the first tile group 611 and transmit the selected digital cell data to the adder trees AT.

FIGS. 10 and 11 are diagrams illustrating layer buffers included in the neuromorphic device according to an example embodiment of the disclosure.

For example, FIG. 10 illustrates the layer buffer storing the matching information of the valid cell tiles storing the weights of each of the first to third layers L1 to L3 in the neuromorphic device 600 according to the example embodiment illustrated in FIG. 8. Referring to FIG. 10, the weights of the first layer L1 may be stored in 40 first valid cell tiles arranged along four row positions and 10 column positions. The weights of the second layer L2 may be stored in 16 second valid cell tiles, and the weights of the third layer L3 may be stored in eight third valid cell tiles.

The matching information stored in the layer buffer may include a row-direction start position TRF, a row-direction end position TRL, a column-direction start position TCF, and a column-direction end position TCL. Referring to FIGS. 8 and 10, the matching information stored in the layer buffer may indicate positions of the first valid cell tiles arranged at vertices of the first to third tile groups 611 to 613 allocated to the cell region 610 of the neuromorphic device 600.

FIG. 11 illustrates the layer buffer storing matching information that enables determination of a position of each of the first to third tile groups 614 to 616 in the neuromorphic device 600 according to the example embodiment illustrated in FIG. 9. Similarly to the example embodiment illustrated in FIG. 10, the matching information stored in the layer buffer may include a row-direction start position TRF, a row-direction end position TRL, a column-direction start position TCF, and a column-direction end position TCL. Referring to FIGS. 9 and 11, the matching information stored in the layer buffer may indicate positions of the first valid cell tiles arranged at vertices of the first to third tile groups 614 to 616 allocated to the cell region 610 of the neuromorphic device 600.

As described above, the weights included in each layer of the neural network may be floating-point type data after learning. On the other hand, data stored in the memory cells of each of the plurality of cell tiles may be fixed-point type or integer type data, and thus, the weights, which are floating-point data, may be quantized into fixed-point type or integer type data.

In the quantization, the weights may be expressed as zero weights and quantized weights. The weights included in one of the plurality of layers may be quantized based on one zero weight. Therefore, in a case where the weights included in one layer are dispersedly stored in two or more cell tiles, the zero weight may be stored in a separate cell tile to improve the degree of integration of the neuromorphic device, which will be described later with reference to FIGS. 18 and 19 and the like.

Figure 12:
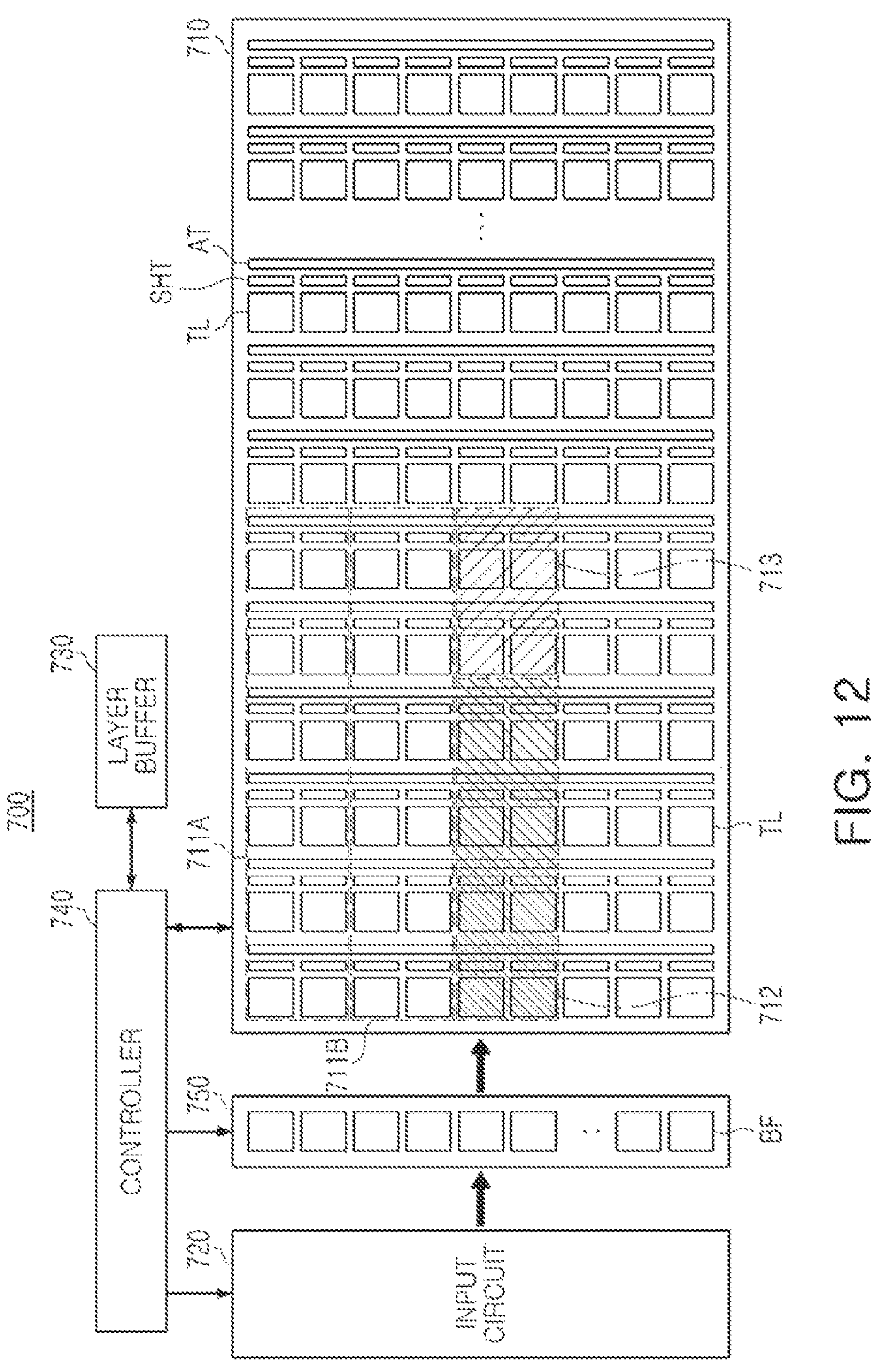
FIG. 12 is a diagram illustrating a neuromorphic device according to an example embodiment of the disclosure.

FIG. 12 is a diagram illustrating a neuromorphic device according to an example embodiment of the disclosure.

Referring to FIG. 12, a neuromorphic device 700 according to an example embodiment of the disclosure may include a cell region 710, an input circuit 720, a layer buffer 730, a controller 740, and the like. A plurality of cell tiles TL, a plurality of offset shifters SHT, and a plurality of adder trees AT may be arranged in the cell region 710. Each of the plurality of cell tiles TL may include a plurality of memory cells, and weights required for executing a neural network-based arithmetic operation may be stored in the plurality of memory cells.

According to an example embodiment, weights corresponding to nodes included in each of a plurality of layers may be dispersedly stored in two or more cell tiles TL. According to an example embodiment of the disclosure, the weights of each of the plurality of layers may be dispersedly stored in two or more cell tiles TL, and two or more cell tiles TL storing the weights included in one layer may be arranged adjacent to each other.

Further, according to an example embodiment of the disclosure, weights included in at least one of the plurality of layers included in the neural network may be redundantly stored. For example, referring to FIG. 12, weights included in a first layer may be redundantly stored in first tile groups 711A and 711B. In other words, each of the first tile groups 711A and 711B may store the same weights of the first layer. Since the same weights included in one layer are stored in each of the first tile groups 711A and 711B, the number of cell tiles TL included in the first group 711A may be equal to the number of cell tiles TL included in the second group 711B.

Therefore, the controller 740 may store the weights in selected valid cell tiles in the cell region 710, and then record, in the layer buffer 730, matching information including information indicating whether or not the weights are redundantly stored, precision information, and the like. When a neural network-based arithmetic operation is executed, the controller 740 may input input data of each layer to valid cell tiles storing weights of the corresponding layer, and may execute an inference operation.

In executing the inference operation, input data to be input to the first layer in which the weights are redundantly stored may be dispersedly input to the first tile groups 711A and 711B according to the number of bit digits. For example, some bits of the input data may be input to the first group 711A among the first tile groups 711A and 711B, and the remaining bits may be input to the second group 711B. Therefore, the speed of a MAC operation to be executed in the first layer may be increased.

The number of first tile groups 711A and 711B may be equal to or less than the number of bits of the input data input to the first layer. For example, when the input data is selected bit by bit and input to the first tile groups 711A and 711B, the number of first tile groups 711A and 711B may be the same as the number of bits of the input data.

When each of the first tile groups 711A and 711B receives the input data and outputs an arithmetic operation result in a form of digital cell data, the offset shifters SHT connected to the cell tiles TL in each of the first tile groups 711A and 711B may execute a multiplication operation on the digital cell data output from the cell tiles TL. For example, assuming that the input data is 4-bit data, two lower bits are input to the first group 711A, and two upper bits are input to the second group 711B, shifters SH of the second group 711B may execute a multiplication operation on the digital cell data output from the cell tiles TL by two bits. Therefore, an arithmetic operation result of the cell tiles TL of each of the first tile groups 711A and 711B in which the weights of the first layer are redundantly stored may be accurately generated and transmitted to the adder trees AT. As illustrated in FIG. 12, the offset shifters SHT may be matched one-to-one with the cell tiles TL. Further, the adder tree AT may be designed to be shared by two or more cell tiles TL arranged in the column direction.

The weights included in the first layer may be redundantly stored in the first tile groups 711A and 711B in the example embodiment illustrated in FIG. 12, but the redundantly stored weights are not necessarily limited thereto. For example, weights included in a second layer and/or a third layer may also be redundantly stored in the cell region 710. When the weights of the second layer are redundantly stored, the controller 740 may divide input data to be input to the second layer according to the number of bit digits and dispersedly input the divided input data to a plurality of second tile groups storing the weights of the second layer. In addition, digital cell data output from cell tiles TL in the second tile group to which upper bits of the input data are input may be subjected to a multiplication operation by the offset shifters SHT and input to the adder trees AT. Since the structures and precisions of the weights of the first layer and the second layer may be different, the number of first valid cell tiles included in the first tile groups 711A and 711B may be different from the number of second valid cell tiles included in the second tile group.

Referring to FIG. 12, the valid cell tiles storing the weights of each layer may be arranged in rectangular tile groups 711A and 711B, 712 and 713. According to an example embodiment of the disclosure, position information that enables identification of each of the tile groups 711A and 711B, 712, and 713 in which the valid cell tiles storing the weights of each layer are arranged, offset information according to the number of bit digits of the input data input to each of the first tile groups 711A and 711B in which the same weights are redundantly stored, and the like, may be stored as the matching information in the layer buffer 730. The controller 740 may execute a neural network-based inference operation by referring to the matching information. Information stored in the layer buffer 730 will be described later with reference to FIG. 13.

Since each of the tile groups 711A and 711B, 712, and 713 is set to have a rectangular shape, there may be a valid cell tile that does not store the weight in at least one of the tile groups 711A and 711B, 712, and 713, or there may be memory cells that do not store the weights in a valid cell tile according to an example embodiment. In this case, all data of the valid cell tile and memory cell that do not store the weight may be zero-padded.

According to an example embodiment, a buffer circuit 750 may be connected between the input circuit 720 and the cell region 710. The buffer circuit 750 may include a plurality of buffers for temporarily storing the input data, and may transmit the input data only to some valid cell tiles that actually execute an arithmetic operation among the valid cell tiles storing the weights in the cell region.

FIG. 13 is a diagram illustrating a layer buffer included in the neuromorphic device according to an example embodiment of the disclosure.

For example, FIG. 13 may illustrate the layer buffer storing the matching information of the valid cell tiles storing the weights of each of the first to third layers L1 to L3 in the neuromorphic device 700 according to the example embodiment illustrated in FIG. 12. Referring to FIG. 13, the weights of the first layer L1 may be stored in 12 first valid cell tiles arranged along two row positions and six column positions. The weights of the second layer L2 may be stored in eight second valid cell tiles, and the weights of the third layer L3 may be stored in four third valid cell tiles.

The matching information stored in the layer buffer may include a row-direction start position TRF, a row-direction end position TRL, a column-direction start position TCF, and a column-direction end position TCL. Referring to FIGS. 12 and 13, the matching information stored in the layer buffer may indicate the position of each of the tile groups 711A and 711B, 712, and 713 that store the weights in the cell region 710 of the neuromorphic device 700.

However, as described above with reference to FIG. 12, the weights of the first layer L1 may be redundantly stored in the first tile groups 711A and 711B, and the layer buffer 730 may store, as the matching information, information that enables determination of whether or not the weights are redundantly stored. Referring to FIG. 13, the matching information of each of the first tile groups 711A and 711B storing the weights of the first layer L1 may be stored in the layer buffer 730. For example, 12 first valid cell tiles included in the first group 711A and 12 first valid cell tiles included in the second group 711B may be arranged adjacent to each other in the column direction, and such arrangement may be stored in the layer buffer 730.

According to the example embodiment illustrated in FIGS. 12 and 13, precision information PI and offset information OFFSET may be stored in the layer buffer 730. The precision information PI may indicate the number of bits of input data input to each of the valid cell tiles. According to the example embodiment illustrated in FIG. 13, the input data of the first layer L1 may be 4-bit data, and two lower bits of the input data may be input to the first valid cell tiles of the first group 711A, and two upper bits may be input to the first valid cell tiles of the second group 711B. Therefore, the precision information PI of the input data input to each of the plurality of first tile groups 711A and 711B may be 2 bits.

The offset information OFFSET may be information required for the offset shifters SHT to execute a multiplication operation on the digital cell data to be input to the adder tree AT, and the controller 740 may control the offset shifters SHT by referring to the offset information OFFSET. For example, the controller 740 may control each of the offset shifters SH connected to the first valid cell tiles of the second group 711B to which two upper bits of the input data are input to execute a multiplication operation on the digital cell data received from the first valid cell tiles by two bits and then transmit the digital cell data to the adder tree AT, by referring to the offset information OFFSET. On the other hand, the offset shifters SHT may not have to execute a multiplication operation on digital cell data output from the first valid cell tiles of the first group 711A to which two lower bits of the input data are input.

Figure 14:
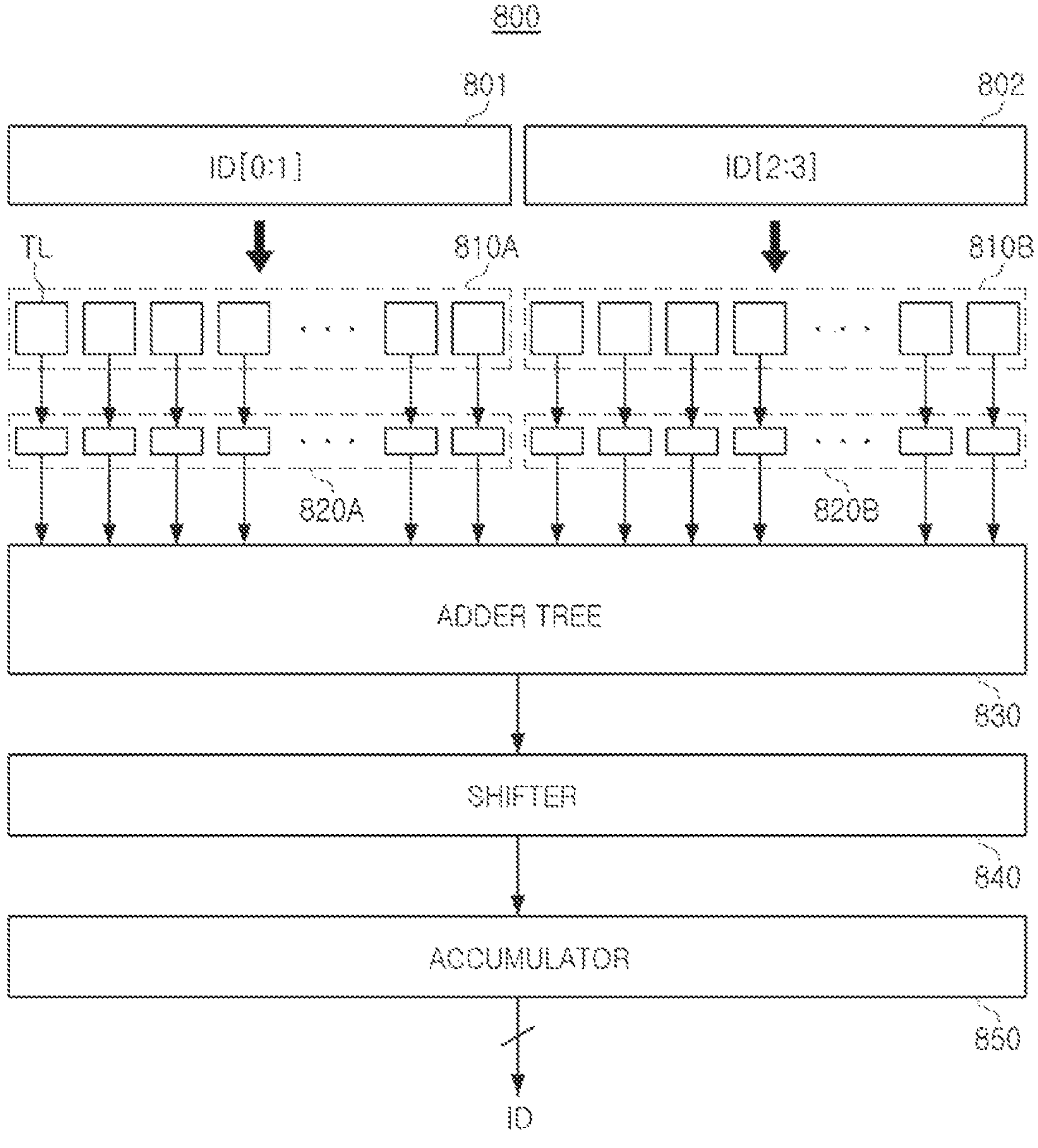
FIG. 14 is a diagram illustrating an operation of a neuromorphic device according to an example embodiment of the disclosure.

FIG. 14 is a diagram illustrating an operation of a neuromorphic device according to an example embodiment of the disclosure.

As described above, according to an example embodiment of the disclosure, weights of at least one of a plurality of layers included in a neural network may be redundantly stored in a plurality of tile groups. Accordingly, a neuromorphic device 800 may divide input data to be input to a layer whose weights are redundantly stored according to the number of bit digits and input the divided input data to the plurality of tile groups when executing a neural network-based inference operation.

According to the example embodiment illustrated in FIG. 14, the input data may be 4-bit data. Referring to FIG. 14, the neuromorphic device 800 may divide the input data into first input data 801 including two lower bits and second input data 802 including two upper bits. The neuromorphic device 800 may input the first input data 801 to the first group 810A among a plurality of tile groups 810A and 810B storing the same weights of the layer to which the input data is to be input, and may input the second input data 802 to the second group 810B. Each of the plurality of tile groups 810A and 810B may include a plurality of cell tiles TL, and the weights may be stored in at least some of the plurality of cell tiles TL.

The cell tiles TL of each of the plurality of tile groups 810A and 810B may output digital cell data corresponding to a result of multiplying the input data and the weight. For example, the digital cell data may be first input to offset shifters 820A and 820B connected upstream of an adder tree 830. The first offset shifters 820A may receive the digital cell data output from the cell tiles TL of the first group 810A, and the second offset shifters 820B may receive the digital cell data output from the cell tiles TL of the second group 810B.

Each of the offset shifters 820A and 820B may execute a multiplication operation on the digital cell data according to offset information determined by the number of bit digits included in each of the first input data 801 and the second input data 802. For example, the first offset shifters 820A that receive the digital cell data corresponding to a result of multiplying the first input data 801 corresponding to two lower bits by the weight do not have to execute a separate multiplication operation. On the other hand, the second offset shifters 820B that receive the digital cell data corresponding to a result of multiplying the second input data 802 corresponding to two upper bits by the weight may execute a multiplication operation on the digital cell data by two bits and then transmit the digital cell data to the adder tree 830.

The adder tree 830 may include a plurality of adders as described above with reference to FIG. 7. A shifter 840 and an accumulator 850 may be connected to an output terminal of the adder tree 830. The shifter 840 and the accumulator 850 may execute a multiplication and accumulate operation on data output from the adder tree 830 by referring to precision of the weights, precision of the input data, and the like. Output data ID of the accumulator 850 may be provided as the input data to valid cell tiles corresponding to the next layer.

Figure 15:
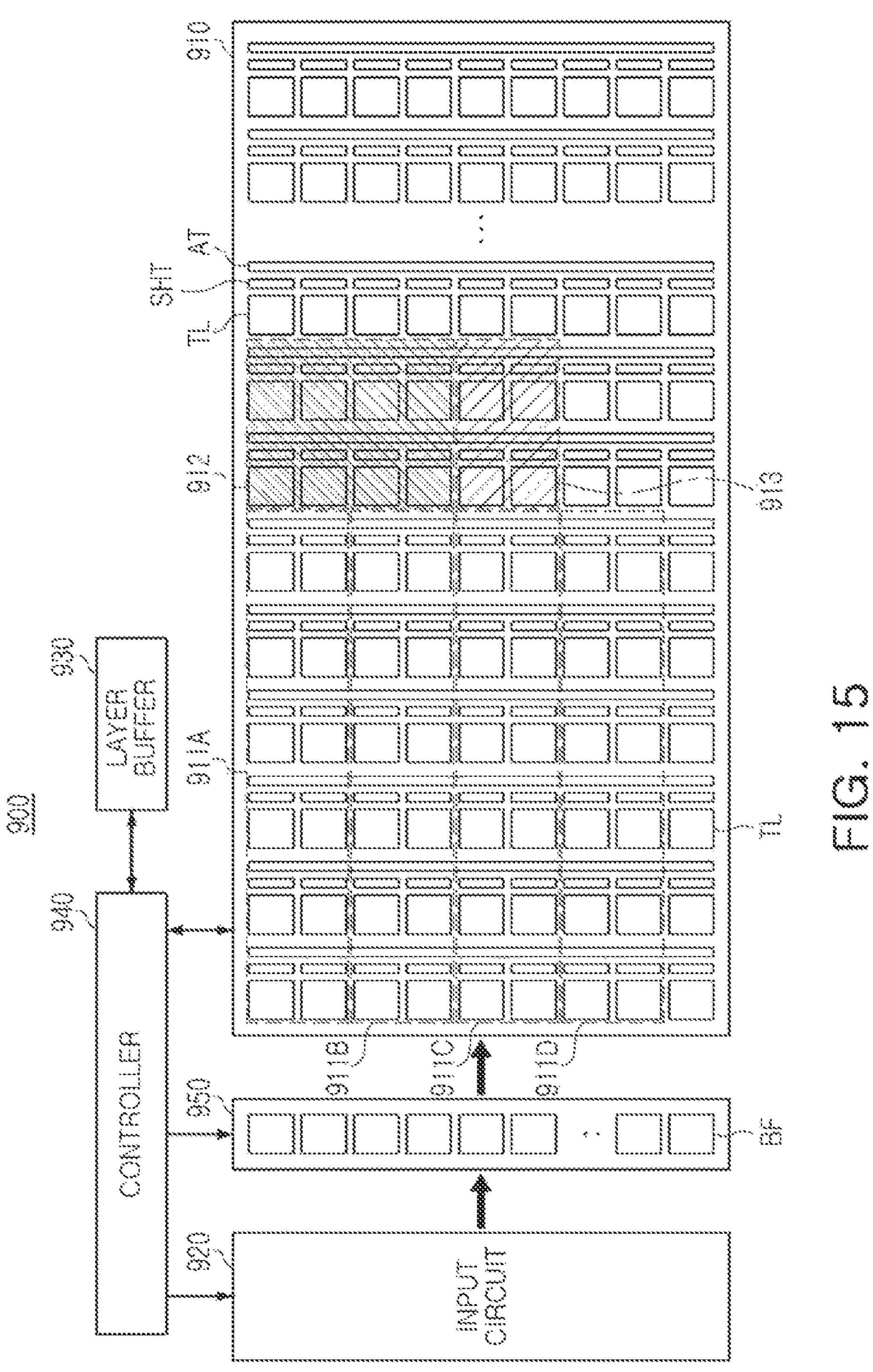
FIG. 15 is a diagram illustrating a neuromorphic device according to an example embodiment of the disclosure.

FIG. 15 is a diagram illustrating a neuromorphic device according to an example embodiment of the disclosure.

Referring to FIG. 15, a neuromorphic device 900 according to an example embodiment of the disclosure may include a cell region 910, an input circuit 920, a layer buffer 930, a controller 940, a buffer circuit 950, and the like. A plurality of cell tiles TL may be arranged in the cell region 910, and operations of the cell region 910, the input circuit 920, the layer buffer 930, the controller 940, the buffer circuit 950, and the like may be similar to those described above with reference to FIG. 12. For example, weights included in a trained neural network may be stored in some of the plurality of cell tiles TL. In addition, weights included in each of a plurality of layers of a neural network may be dispersedly stored in two or more cell tiles TL. Two or more cell tiles TL dispersedly storing weights included in one layer may be arranged adjacent to each other.

The plurality of cell tiles TL may be arranged in the cell region 910 while being matched with a plurality of offset shifters SHT and a plurality of adder trees AT. For example, the plurality of cell tiles TL may be arranged in the cell region 910 by being matched one-to-one with the plurality of offset shifters SHT. Further, two or more cell tiles TL adjacent to each other among the plurality of cell tiles TL may be arranged in the cell region 910 to share one adder tree AT.

According to an example embodiment of the disclosure, weights included in at least one of a plurality of layers included in a neural network may be redundantly stored. In the example embodiment illustrated in FIG. 15, weights included in a first layer may be redundantly stored in four first tile groups 911A to 911D. The controller 940 may divide input data to be input to the first layer according to the number of bit digits and simultaneously input the divided input data to the first tile groups 911A to 911D, thereby rapidly executing an arithmetic operation corresponding to the first layer.

For example, in a case where the input data is 4-bit data, the controller 940 may divide the input data into bits and input the bits to the first tile groups 911A to 911D. The least significant bit of the input data may be input to the first group 911A, the second bit may be input to the second group 911B, the third bit may be input to the third group 911C, and the most significant bit may be input to the fourth group 911D.

When each of the first tile groups 911A to 911D receives one bit of the input data and outputs an arithmetic operation result in a form of digital cell data, the offset shifters SHT in each of the first tile groups 911A to 911D may execute a multiplication operation on the digital cell data output from the cell tiles TL. For example, according to the above assumption, the offset shifters SHT of the second group 911B may execute a multiplication operation on the digital cell data output from the cell tiles TL by one bit, and the offset shifters SHT of the third group 911C may execute a multiplication operation on the digital cell data output from the cell tiles TL by two bits. In addition, the offset shifters SHT of the fourth group 911D may execute a multiplication operation on the digital cell data output from the cell tiles TL by three bits. Therefore, an arithmetic operation result may be accurately generated in each of the first tile groups 911A to 911D in which the weights of the first layer are redundantly stored and may be transmitted to the adder trees AT.

FIG. 16 is a diagram illustrating layer buffers included in the neuromorphic device according to an example embodiment of the disclosure.

FIG. 16 illustrates the layer buffer storing matching information of valid cell tiles storing the weights of each of the first to third layers L1 to L3 in the neuromorphic device 900 according to the example embodiment illustrated in FIG. 15. Referring to FIG. 16, 12 first valid cell tiles arranged along two row positions and six column positions may be required for storing the weights of the first layer L1. The weights of the second layer L2 may be stored in eight second valid cell tiles, and the weights of the third layer L3 may be stored in four third valid cell tiles.

As described above with reference to FIG. 15, the weights of the first layer L1 may be redundantly stored in the plurality of first tile groups 911A to 911D, and the layer buffer 930 may store, as the matching information, information that enables determination of whether or not the weights are redundantly stored. Referring to FIG. 16, the matching information indicating the position of each of the first tile groups 911A to 911D storing the weights of the first layer L1 may be stored in the layer buffer 930. For example, the first tile groups 911A to 911D may be arranged in the column direction, and thus, the positions of the first tile groups 911A to 911D in the column direction may be the same.

Precision information PI and offset information OFFSET may be stored in the layer buffer 930 together with the matching information. The precision information PI may indicate the number of bits of the input data input to each of the valid cell tiles. As described above, the input data of the first layer L1 may be 4-bit data, the input data may be divided into bits, and the bits may be input to the first tile groups 911A to 911D respectively. Therefore, the precision information PI of the input data input to each of the plurality of first tile groups 911A to 911D may be one bit.

The offset information OFFSET may be information required for executing a multiplication operation on the digital cell data upstream of the adder tree AT, and the controller 940 may control the offset shifters SHT by referring to the offset information OFFSET. For example, the controller 940 may control the offset shifters SHT to execute a multiplication operation on the digital cell data output from each of the second to fourth groups 911B to 911D by referring to the offset information OFFSET, and then input the digital cell data to the adder trees. The multiplication operation does not have to be executed on the digital cell data output from the first group 911A to which the least significant bit of the input data is input.

Figure 17:
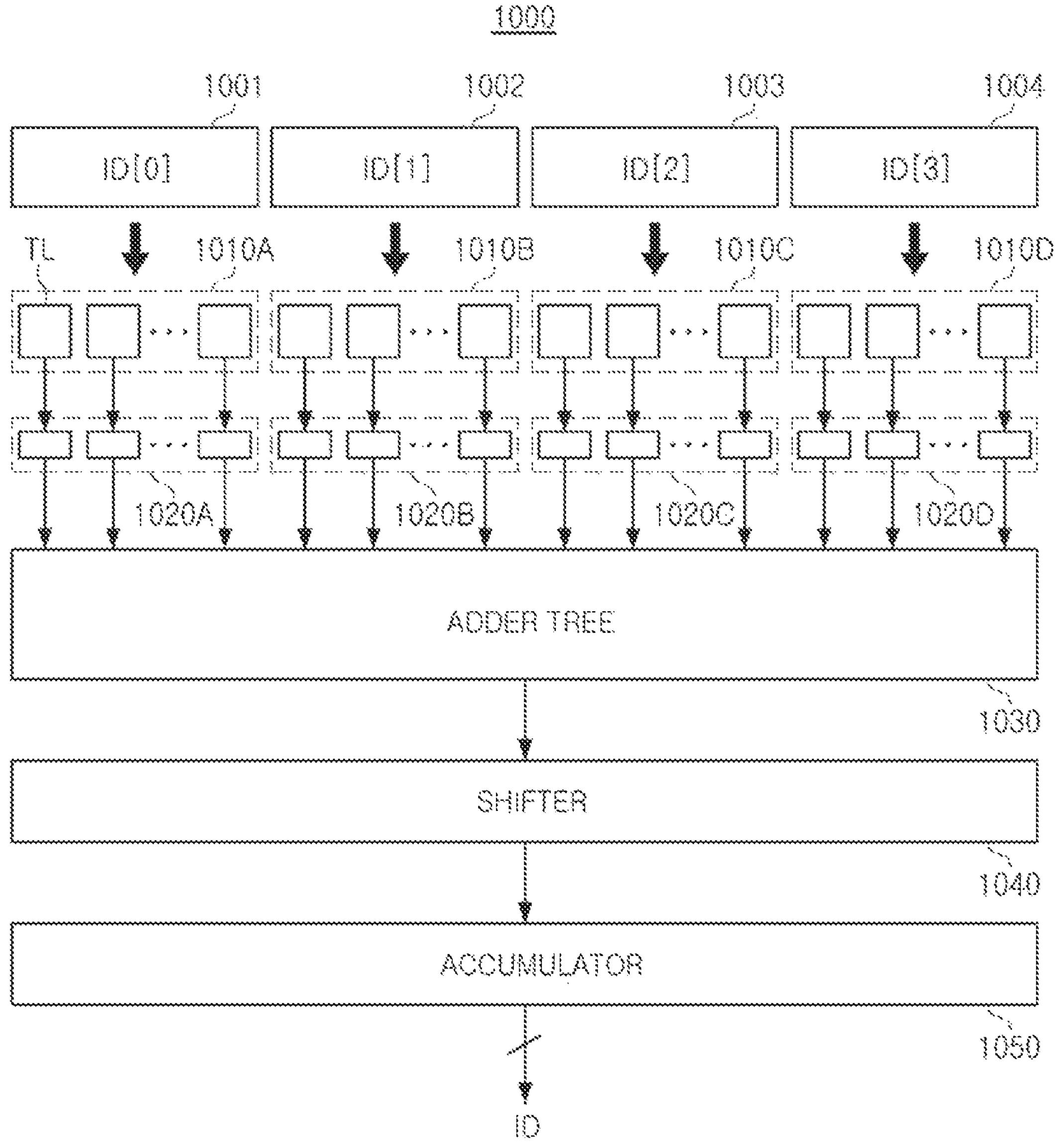
FIG. 17 is a diagram illustrating an operation of a neuromorphic device according to an example embodiment of the disclosure.

FIG. 17 is a diagram illustrating an operation of a neuromorphic device according to an example embodiment of the disclosure.

As described above, according to an example embodiment of the disclosure, weights of at least one of a plurality of layers included in a neural network may be redundantly stored in a plurality of tile groups. According to the example embodiment illustrated in FIG. 17, input data may be 4-bit data. A neuromorphic device 1000 may generate first to fourth input data 1001 to 1004 by dividing the input data into bits. For example, the first input data 1001 may include the least significant bit, and the fourth input data 1004 may include the most significant bit.

The neuromorphic device 1000 may sequentially match and input the first to fourth input data 1001 to 1004 with and to a plurality of tile groups 1010A to 1010D storing the same weights of a layer to which the input data is to be input. For example, the first input data 1001 may be input to the first group 1010A, and the second input data 1002 may be input to the second group 1010B. Further, the third input data 1003 may be input to the third group 1010C and the fourth input data 1004 may be input to the fourth group 1010D. Each of the plurality of tile groups 1010A to 1010D may include a plurality of cell tiles TL.

The cell tiles TL of each of the plurality of tile groups 1010A to 1010D may output digital cell data corresponding to a result of multiplying the input data and the weight. For example, the digital cell data may be first input to offset shifters 1020A to 1020D connected upstream of an adder tree 1030. For example, the offset shifters 1020A to 1020D may be matched one-to-one with the cell tiles TL included in the plurality of first tile groups 1010A to 1010D.

Each of the offset shifters 1020A to 1020D may execute a multiplication operation on the digital cell data output from the cell tiles TL according to offset information stored in a layer buffer as described above with reference to FIG. 16. Referring to FIG. 16 together, the second to fourth offset shifters 1020B to 1020D excluding the first offset shifters 1020A may execute a multiplication operation on the digital cell data and then transmit the digital cell data to the adder tree 1030. For example, the second offset shifters 1020B may execute a multiplication operation on the digital cell data by one bit, the third offset shifters 1020C may execute a multiplication operation on the digital cell data by two bits, and the fourth offset shifters 1020D may execute a multiplication operation on the digital cell data by three bits.

The adder tree 1030 may include a plurality of adders as described above with reference to FIG. 7. A shifter 1040 and an accumulator 1050 may be connected to an output terminal of the adder tree 1030. The shifter 1040 and the accumulator 1050 may execute a multiply and accumulate operation on data output from the adder tree 1030 by referring to precision of the weights, precision of the input data, and the like. Output data ID of the accumulator 1050 may be provided as the input data to valid cell tiles corresponding to the next layer.

Figure 18:
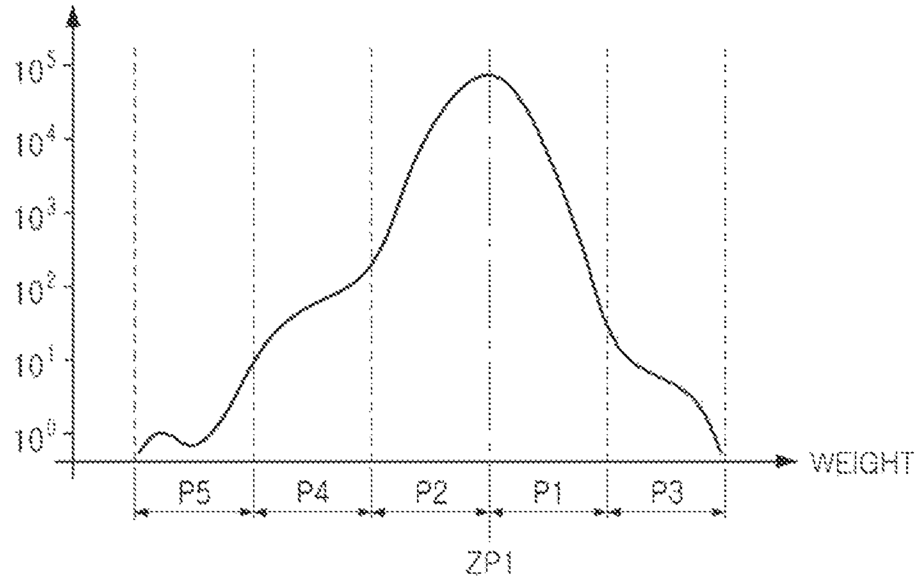
FIGS. 18 and 19 are diagrams illustrating a method of storing weights in a neuromorphic device according to an example embodiment of the disclosure.
Figure 19:
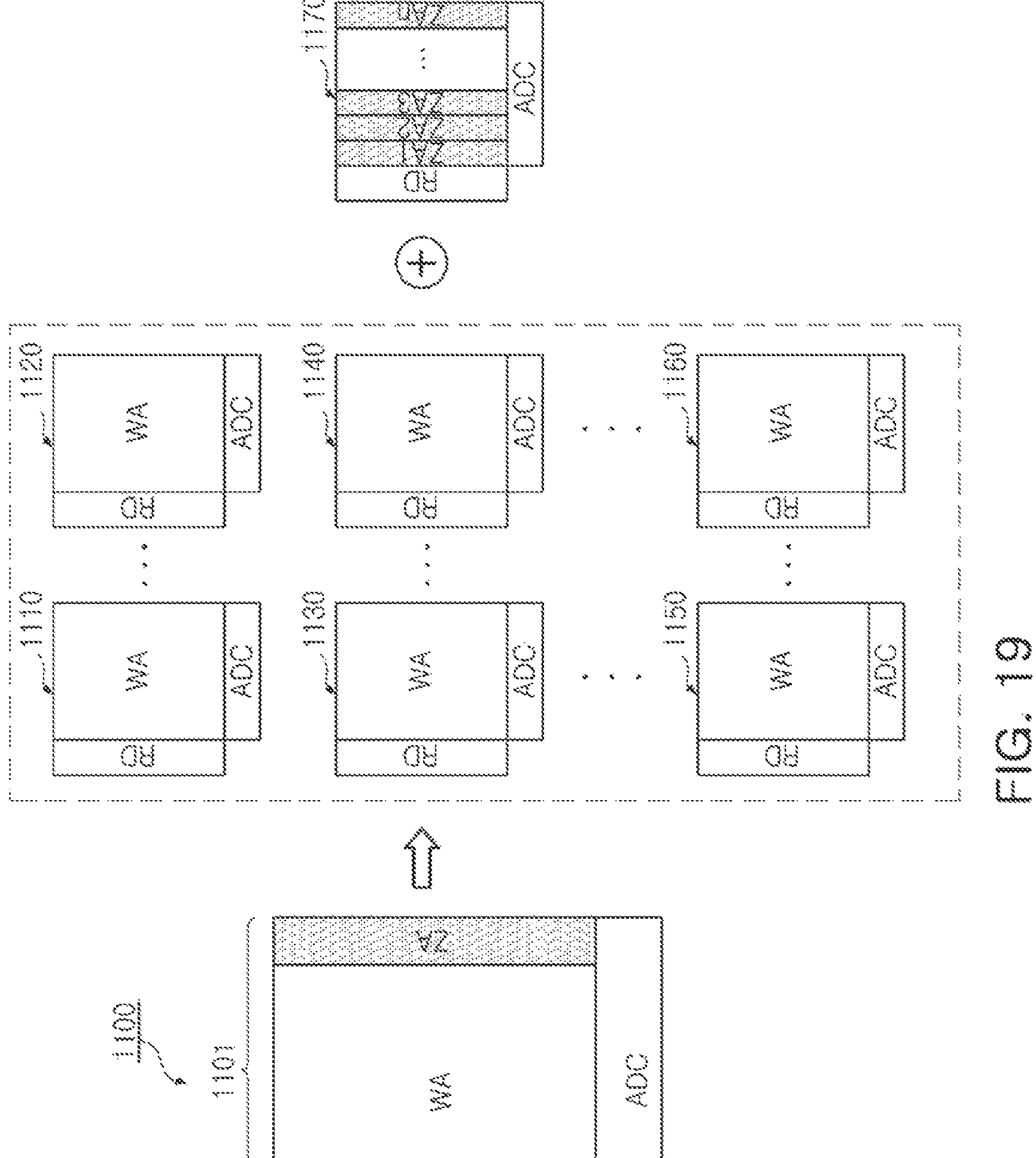

FIGS. 18 and 19 are diagrams illustrating a method of storing weights in a neuromorphic device according to an example embodiment of the disclosure.

As described above, the neuromorphic device according to an example embodiment of the disclosure may quantize and store weights allocated to branches between nodes in each of a plurality of layers in a trained neural network. FIG. 18 is a graph showing a distribution of the weights included in one of the plurality of layers. In the example embodiment illustrated in FIG. 18, the horizontal axis may represent values of the weights, and the vertical axis may represent the number of weights having corresponding values. In other words, FIG. 18 illustrates a distribution of real weights stored in one layer in a trained neural network, and the weights may be floating-point type data.

Referring to FIG. 18, after the distribution of the real weights included in one of the layers of the trained neural network is obtained, a representative value of the distribution may be selected as a zero weight ZP1. In the example embodiment illustrated in FIG. 18, the real weights expressed as floating points may be divided into a plurality of sections P1 to P5 having the same length and quantized. As an example, the quantization may be executed as in Equation (2).

$$r = s(q - z) \tag{2}$$

In Equation (2), r may represent a real weight, q may represent a quantized weight allocated to each of the plurality of sections P1 to P5, z may represent the zero weight ZP1, and s may represent a scale value applied to the quantization. For example, real weights included in the first section P1 greater than the zero weight ZP1 may be converted into first quantized weights, and real weights included in the second section P2 smaller than the zero weight ZP1 may be converted into second quantized weights. For example, a difference between the first quantized weights and the zero weight ZP1 may be the same as a difference between the second quantized weights and the zero weight ZP1 and may have an opposite sign. In other words, in a case where the difference between the first quantized weights and the zero weight ZP1 is $+\alpha$, the difference between the second quantized weights and the zero weight ZP1 may be $-\alpha$.

In each of the plurality of cell tiles storing the weights, a cell array in which a plurality of memory cells are arranged may include a weight region in which memory cells storing quantized weights are arranged, and a zero region in which memory cells storing a zero weight are arranged. Real weights corresponding to at least one layer among the plurality of layers may be dispersedly stored in two or more cell tiles according to the number of nodes and precision of the weights. In this case, since real weights corresponding to one layer are dividedly stored, the weight regions of the two or more cell tiles may store different data. On the other hand, since only one zero weight is required to quantize the real weights included in one layer, the zero regions of the two or more cell tiles may store the same data. Therefore, according to an example embodiment of the disclosure, a zero weight for quantizing real weights corresponding to one layer may be stored in a cell tile provided separately from cell tiles storing quantized weights.

Referring to FIG. 19, in order to implement one of the layers of the neural network, one tile included in a neuromorphic device 1100 may include a cell array 1101, a row driver 1102, an ADC 1103, and the like. A zero weight and quantized weights may be generated by quantizing real weights of a corresponding layer, the zero weight may be stored in a zero region ZA of the cell array 1101, and the quantized weights may be stored in a weight region WA of the cell array 1101.

The weights may be dispersedly stored in a plurality of cell tiles 1110 to 1170 according to the number of nodes included in the corresponding layer and precision of the weights. According to the example embodiment illustrated in FIG. 19, data stored in the weight region WA may be dispersedly stored in the plurality of cell tiles 1110 to 1160, and data stored in the zero region ZA may be stored in the separate cell tile 1170.

For example, in a case where the cell array 1101 before the dispersion includes 496 row lines and requires 128 column lines to store the weights, the weights may be dispersedly stored in the cell tiles 1110 to 1170 respectively including 31 row lines and 32 column lines. Referring to FIG. 19, in the separate tile 1170 provided for the purpose of storing the zero weight, zero weights applied in a process of quantizing the weights of each of the plurality of layers included in the neural network may be stored together. Accordingly, as illustrated in FIG. 19, one tile 1170 may include a plurality of zero regions ZA1 to ZAn for storing zero weights of different layers.

In a case where each of the input values is quantized into a quantized input value and a zero input value, and each of the weights is quantized into a quantized weight and a zero weight, an arithmetic operation using the zero weight and the quantized input value of one layer, the zero weight, and the zero input value may be executed only once according to the example embodiment illustrated in FIG. 19. As a result, power consumption of the neuromorphic device 1100 may be reduced. Further, since it is not necessary to store the zero weight in each of the plurality of cell tiles 1110 to 1160 that dispersedly store weights corresponding to one layer, the degree of integration of the neuromorphic device 1100 may also be improved.

In an inference operation of the neuromorphic device 1100, not only the weights but also the input data may be quantized. For example, the inference operation of the neuromorphic device 1100 may be executed based on quantized input data r1 and the weight r2 as in Equation (3).

$$r1 = s1(q1 - z1) \quad (3)$$
$$r2 = s2(q2 - z2)$$

As described above, a MAC operation may be executed between the layers included in the neural network. Accordingly, output data r3 output from each layer may be expressed as in Equation (4).

$$r3 = s3(q3 - z3) = \sum s1(q1 - z1) * s2(q2 - z2) \quad (4)$$

As shown in Equation (4), the output data r3 may also be expressed in a quantized form.

Equation (4) may be expressed as in Equation (5):

$$q3 = z3 + M\sum(q1 * q2 - q1 * z2 - q2 * z1 + z1 * z2) \quad (5)$$

where M may represent a value calculated from scale values s1 to s3 and may be s1*s2/s3.

In Equation (5), arithmetic operation results (q2*z1 and z1*z2) using the zero weight z1 may vary only by the number of is included in the input data. Therefore, according to an example embodiment of the disclosure, in a process of quantizing the input data, a zero operation result according to the number of 1s that the input data may have may be stored in advance in a layer buffer. A controller of the neuromorphic device 1100 may count the number of 1s included in input data input to valid cell tiles to select a zero operation result from the layer buffer, and thus the zero operation result may be obtained quickly without a separate arithmetic operation. This will hereinafter be described in more detail with reference to FIGS. 20 and 21.

Figure 20:
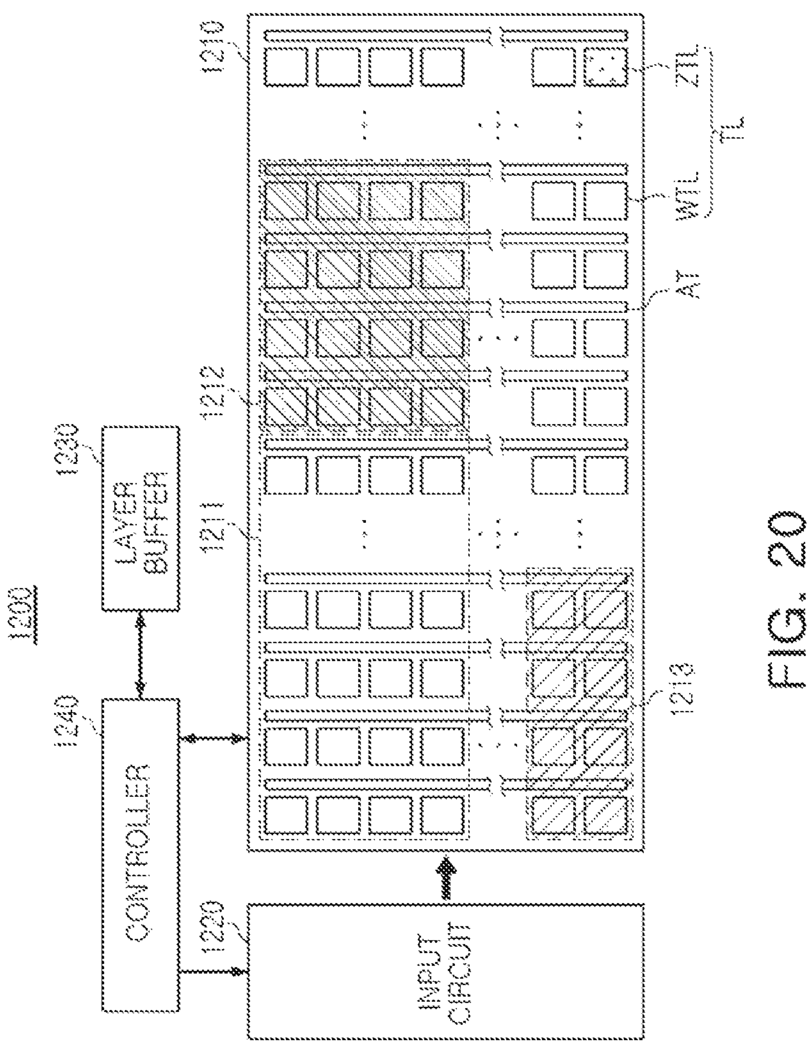
FIGS. 20 and 21 are diagrams illustrating an operation of a neuromorphic device according to an example embodiment of the disclosure.
Figures 21, 22:
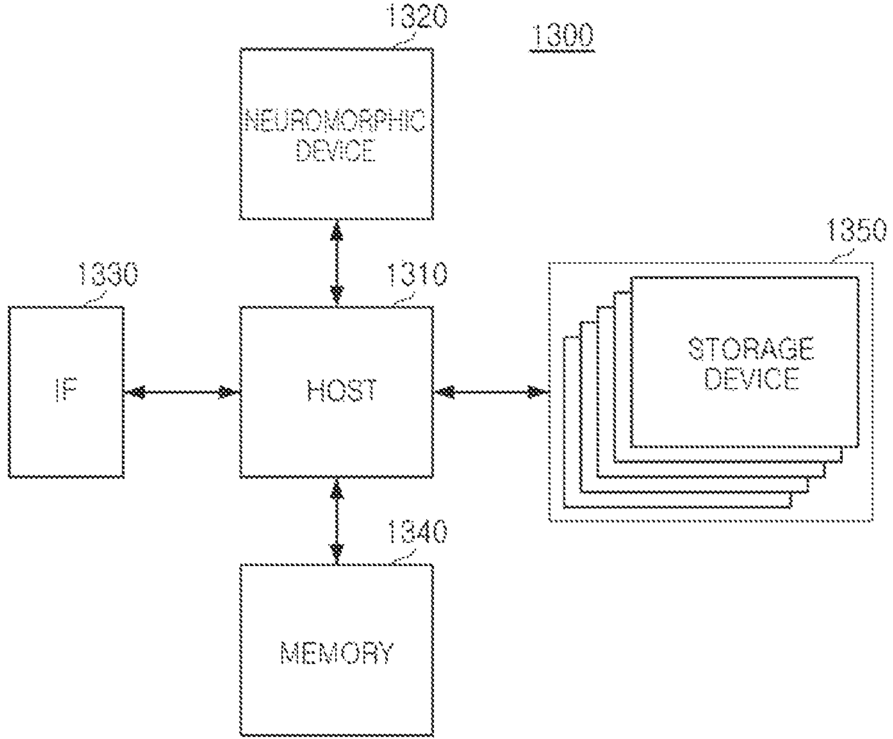
FIGS. 22 and 23 are diagrams illustrating a semiconductor device including a neuromorphic device according to an example embodiment of the disclosure.

FIGS. 20 and 21 are diagrams illustrating an operation of a neuromorphic device according to an example embodiment of the disclosure.

Referring to FIG. 20, a neuromorphic device 1200 according to an example embodiment of the disclosure may include a cell region 1210, an input circuit 1220, a layer buffer 1230, a controller 1240, and the like. A plurality of cell tiles TL and a plurality of adder trees AT may be arranged in the cell region 1210, each of the plurality of cell tiles TL may include a plurality of memory cells, and weights required for executing neural network-based arithmetic operation may be stored in the plurality of memory cells.

For example, weights corresponding to nodes included in each of a plurality of layers may be dispersedly stored in two or more cell tiles TL. Referring to FIG. 20, first valid cell tiles storing weights of a first layer may be arranged in a first tile group 1211, and second valid cell tiles storing weights of a second layer may be arranged in a second tile group 1212. Third valid cell tiles storing weights of a third layer may be arranged in a third tile group 1213. According to an example embodiment, weights included in one layer may be redundantly stored in a plurality of tile groups, and in this case, the controller 1240 may divide input data input to the corresponding layer according to the number of bit digits and input the divided input data to a plurality of tile groups.

As a result, an arithmetic operation speed of the neuromorphic device 1200 may be improved.

The plurality of cell tiles TL may include a weight tile WTL storing a quantized weight and a zero tile ZTL storing a zero weight. According to the example embodiment illustrated in FIG. 20, the cell region 1210 includes only one zero tile ZTL. However, the cell region 1210 may also include two or more zero tiles ZTL.

As described above, the neuromorphic device 1200 may quantize the input data and the weight, respectively, to execute an inference operation of the neural network. In addition, a zero operation result, which is a result of an arithmetic operation using the zero weight generated in a process of quantizing the weights and the input data may be determined only according to the number of is included in the input data and the zero weight.

According to an example embodiment of the disclosure, the zero operation result according to the number of 1s that may be included in the input data may be stored in advance in the layer buffer 1230 for each of the plurality of layers. When the input data input to one of the plurality of layers is determined, the controller 1240 may count the number of is included in the input data, and may read, based on the count result, a zero operation result for the corresponding layer from the layer buffer 1230 and transmit the zero operation result to the adder trees AT. Accordingly, power consumption and arithmetic operation load of the zero operation may be reduced.

FIG. 21 illustrates an example of the zero operation result stored in the layer buffer. Referring to FIG. 21, a zero operation result according to the number of is that may be included in the input data may be stored in the layer buffer for each of the first to third layers L1 to L3. According to the example embodiment illustrated in FIG. 21, the input data may be 5-bit digital data, and a zero operation result for each of the layers L1 to L3 may be determined according to the number of 1s included in the input data and a zero weight z2 obtained in a process of quantizing the weights of each of the layers L1 to L3.

In the neuromorphic device according to an example embodiment of the disclosure, as described above, the zero weight may be stored in a separate zero tile. In addition, in a neural network-based inference operation, the controller may count the number of 1s included in the input data and read the zero operation result stored in advance from the layer buffer, and thus, the arithmetic operation load and power consumption may be reduced.

In addition, according to an example embodiment of the disclosure, the plurality of cell tiles included in the cell region of the neuromorphic device may be dynamically allocated to the plurality of layers included in the neural network according to the structure of the neural network and precision of the weights. Matching information indicating positions of valid cell tiles corresponding to each of the layers may be stored in the layer buffer so that valid cell tiles allocated to each of the plurality of layers and actually storing the weights may be distinguished for each layer. Therefore, in the inference process, the controller may accurately input the input data of each layer to valid cell tiles in which weights of the corresponding layer are dispersedly stored by referring to the matching information, and digital cell data output from the valid cell tiles may be input to the adder tree to obtain a MAC operation result.

According to an example embodiment of the disclosure, the same weights included in at least one of the plurality of layers included in the neural network may be stored redundantly in the plurality of tile groups. In other words, each of two or more tile groups defined to include the same number of cell tiles may store the same data. Thereafter, in the neural network-based inference operation, the input data of the corresponding layer may be divided according to the number of bit digits and input to each of the two or more tile groups. Therefore, an arithmetic operation executed in nodes included in the corresponding layer may be quickly executed.

Figure 23:
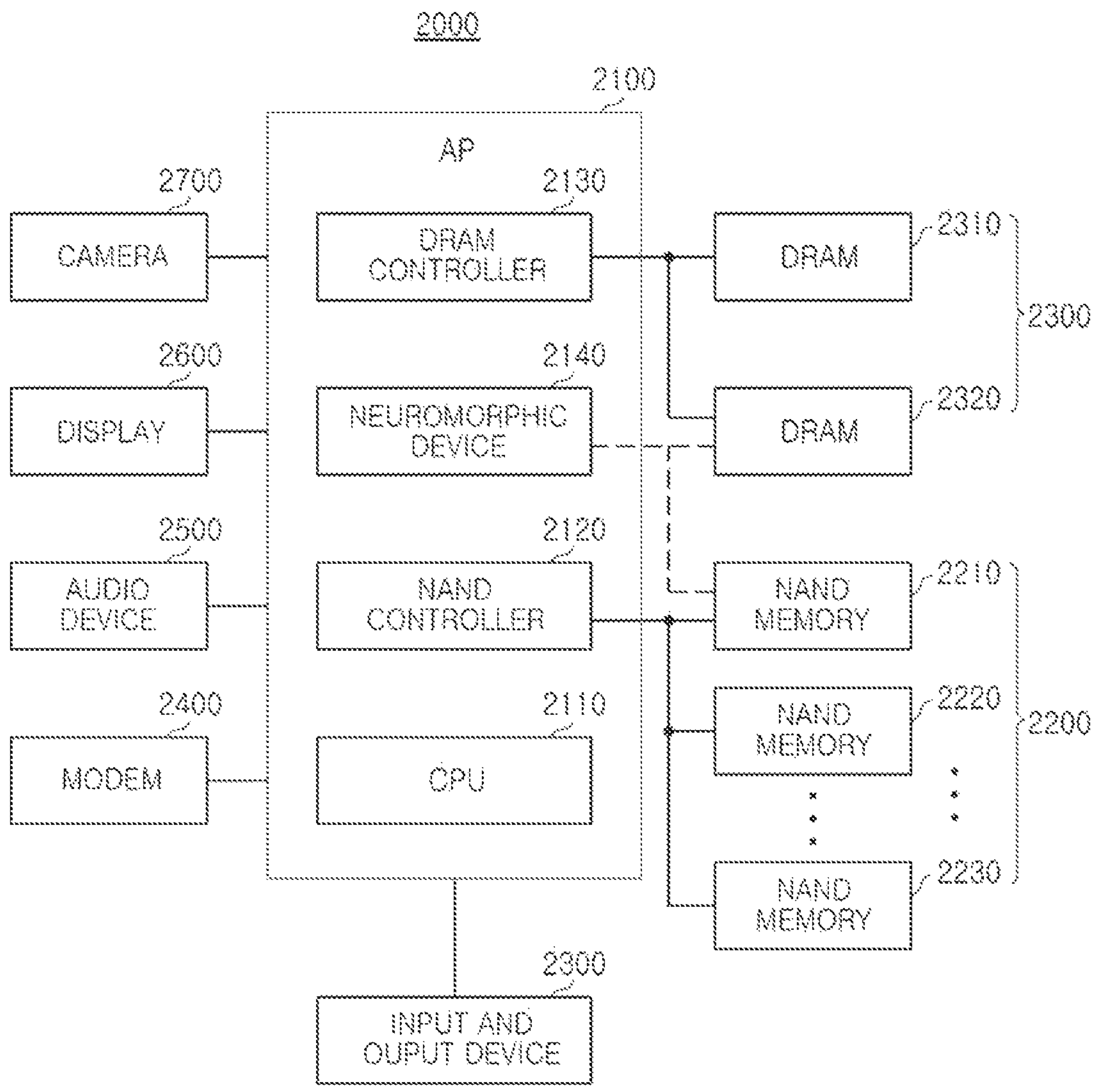

FIGS. 22 and 23 are diagrams illustrating a semiconductor device including a neuromorphic device according to an example embodiment of the disclosure.

Referring to FIG. 22, a neuromorphic device 1320 according to an example embodiment of the disclosure may be included in an electronic device 1300 in a stand-alone form. The electronic device 1300 may include a host 1310, an interface 1330, a memory 1340, and a storage unit 1350 in addition to the neuromorphic device 1320. For example, the electronic device 1300 may be an application server or a storage server arranged in a data center or the like, and may be connected to a network through the interface 1330.

The host 1310 may be a central processing unit (CPU) that controls an overall operation of the electronic device 1300, and may be implemented by a processor including at least one core. The host 1310 may write data to the storage unit 1350 including a plurality of storage devices, read data stored in the storage unit 1350, or delete data stored in the storage unit 1350. The memory 1340 may be implemented by a dynamic random access memory or the like, and the host 1310 may execute commands and/or data loaded into the memory 1340.

The neuromorphic device 1320 may execute a neuromorphic arithmetic operation necessary for the operation of the electronic device 1300, and may be implemented in a stand-alone form as described above. In other words, according to an example embodiment illustrated in FIG. 22, the neuromorphic device 1320 may be implemented as a device separate from the host 1310. For example, the neuromorphic device 1320 and the host 1310 may be included in a form of a separate package in the electronic device 1300.

According to an example embodiment of the disclosure, the host 1310 may instead execute some of the neuromorphic arithmetic operations of the neuromorphic device 1320, and pass an arithmetic operation result to the neuromorphic device 1320. As an example, the neuromorphic device 1320 may execute a MAC operation corresponding to a neural network trained in advance as described above, and may quantize weights and input values of one of layers of the neural network to execute the MAC operation.

The neuromorphic device 1320 may include a plurality of memory cells for storing weights corresponding to a plurality of layers included in the neural network. The plurality of memory cells may be dispersedly arranged in a plurality of cell tiles, and each of the plurality of cell tiles may include cell ADCs that convert, into digital cell data, cell currents corresponding to arithmetic operation results of the weights stored in the plurality of memory cells and input values transmitted to the plurality of memory cells through a plurality of row lines. The neuromorphic device 1320 may have a characteristic according to at least one of the above-described example embodiments.

Referring to FIG. 23, a neuromorphic device 2140 according to an example embodiment of the disclosure may be included in a form of a system-on-chip together with a CPU 2110, a NAND controller 2120, a dynamic RAM (DRAM) controller 2130, and the like in an application processor (AP) 2100. According to the example embodiment illustrated in FIG. 23, an electronic device 2000 may be a mobile device such as a laptop computer, a mobile phone, a smart phone, a tablet personal computer, a wearable device, a healthcare device, or an Internet-of-Things (IoT) device.

Referring to FIG. 23, an electronic device 2000 may include an input and output device 2300, a modem 2400, an audio device 2500, a display 2600, a camera 2700, an AP 2100, a DRAM 2300 (e.g., DRAMs 2310 and 2320), and a NAND memory 2200 (e.g., NAND memories 2210 to 2230), and the like.

The camera 2700 may capture a still image or a moving image under the control of the user. The electronic device 2000 may obtain and recognize specific information by using a still image and a moving image captured by the camera 2700 to inform of related information, convert a still image and a moving image into other types of data such as text, and store the content. Alternatively, the electronic device 2000 may recognize a character string included in a still image/moving image captured by the camera 2700 and provide a text/audio translation of text corresponding to the character string.

The display 2600 may be implemented in various forms such as a liquid crystal display (LCD), an organic light emitting diode (OLED) display, an active-matrix OLED (AM-OLED), a plasma display panel (PDP), a field emission display (FED), and an electronic paper. The display 2600 may have a touch screen function to be used as an input device of the electronic device 2000, or may be provided integrally with a fingerprint sensor to provide a security function of the electronic device 2000.

The audio device 2500 may process and output audio data stored inside the electronic device 2000, or audio data included in a content of a network received from the outside through the input and output device 2300 or the like. The modem 2400 may modulate and transmit a signal for wired or wireless data transmission and reception, and may demodulate original data from a signal received from the outside. The input and output device 2300 may be devices that provide digital input and output, and may include a port connectable to an external recording medium, an input device such as a touch screen or a mechanical button key, an output device capable of outputting vibration in a form of haptic vibration or the like, and the like.

The AP 2100 controls an overall operation of the electronic device 2000. Specifically, the AP 2100 may control the display 2600 in such a way that a part of the content stored in the NAND memory 2200 is displayed on the display 2600. Further, the AP 2100 may execute a control operation corresponding to a user input received through the input and output device 2300 or the like.

The AP 2100 may be provided as a system-on-chip ("SoC") that drives an application program, an operating system (OS), and the like. Accordingly, the AP 2100 may include the CPU 2110 that executes an arithmetic operation or runs an application program and/or an operating system, and various other peripheral components connected to the CPU 2110 through a system bus. The peripheral components may include the DRAM controller 2130, the neuromorphic device 2140, the NAND controller 2120, an internal memory, a power management block, an error detection block, a monitoring block, and the like. The CPU 2110 may include one or more cores. The neuromorphic device 2140 may have a characteristic according to at least one of the above-described example embodiments.

As set forth above, according to the example embodiment of the disclosure, weights of a neural network may be stored in a plurality of cell tiles by dynamically matching a plurality of layers to the plurality of cell tiles according to a structure of the plurality of layers included in the neural network. As a result, the neuromorphic device applicable to neural networks having various structures may be implemented. In addition, an arithmetic operation speed of the neuromorphic device may be improved by redundantly storing a weight of at least one layer among the plurality of layers in a plurality of tile groups and inputting input data to the tile groups at the same time in a divided manner according to the number of bit digits.

Provided a neuromorphic device with improved versatility, improved arithmetic operation speed, and reduced power consumption. A plurality of cell tiles may be formed in a cell region, weights of each layer may be dispersedly stored in two or more adjacent cell tiles when storing weights of a neural network, and matching information of the cell tiles storing the weights of each of the layers may be stored in a separate layer buffer. In an inference operation, a controller may input data to each cell tile by referring to the matching information of the layer buffer. As a result, a neuromorphic device applicable to neural networks having various structures may be implemented. In addition, the speed of the inference operation may be improved by redundantly storing weights of one layer in a plurality of tile groups, dividing the input data according to the number of bit digits and inputting the divided input data to each of the plurality of tile groups in the inference operation.

Various and beneficial advantages and effects according to example embodiments are not limited to the contents described above, and may be more easily understood in a process of describing example embodiments.

While example embodiments have been illustrated and described above, it will be apparent to those skilled in the art that modifications and variations could be made without departing from the scope of the disclosure as defined by the appended claims.

What is claimed is:

1. A neuromorphic device comprising:

a plurality of cell tiles, each of the plurality of cell tiles comprising:

a cell array comprising a plurality of memory cells storing weights of a neural network, a row driver connected to the plurality of memory cells through a plurality of row lines, and cell analog-to-digital converters (ADCs) connected to the plurality of memory cells through a plurality of column lines; and a controller configured to:

select, form the plurality of cell tiles, a plurality of valid cell tiles storing the weights, execute a neural network-based arithmetic operation based on the plurality of valid cell tiles, redundantly store weights of a first layer among a plurality of layers included in the neural network in a plurality of first valid cell tiles that are divided into a plurality of first tile groups, input a lower bit of input data input to the first layer to a first tile group of the plurality of first tile groups, and input an upper bit of the input data to a second tile group of the plurality of first tile groups during the neural network-based arithmetic operation.

2. The neuromorphic device of claim 1, wherein a number of cell tiles included in the first tile group of the plurality of first tile groups is equal to a number of cell tiles included in the second tile group of the plurality of first tile groups.

3. The neuromorphic device of claim 1, wherein the neural network comprises a second layer connected to the first layer, and wherein the controller is further configured to:

redundantly store weights of the second layer in a plurality of second valid cell tiles that are divided into a plurality of second tile groups, input a lower bit of input data input to the second layer to a first tile group of the plurality of second tile groups, and input an upper bit of the input data to a second tile group of the plurality of second tile groups.

4. The neuromorphic device of claim 3, wherein a number of the plurality of first valid cell tiles is different from a number of the plurality of second valid cell tiles.

5. The neuromorphic device of claim 1, wherein at least two of the plurality of memory cells included in at least one of the plurality of first valid cell tiles in each of the plurality of first tile groups are zero-padded.

6. The neuromorphic device of claim 1, further comprising:

a plurality of adder trees configured to add digital cell data output from at least two valid cell tiles corresponding to one of the plurality of layers.

7. The neuromorphic device of claim 6, further comprising:

a plurality of offset shifters connected between the plurality of cell tiles and the plurality of adder trees and configured to execute a multiplication operation on outputs of the cell ADCs based on a number of bit digits of the input data input to the plurality of cell tiles.

8. The neuromorphic device of claim 7, wherein at least two of the plurality of offset shifters connected to the second tile group of the plurality of first tile groups are configured execute the multiplication operation on the outputs of the cell ADCs.

9. The neuromorphic device of claim 6, further comprising:

a shifter configured to execute a multiplication operation on outputs of at least some of the plurality of adder trees; and an accumulator configured to accumulate an output of the shifter.

10. The neuromorphic device of claim 1, further comprising:

a layer buffer configured to store matching information between the plurality of layers included in the neural network and the plurality of valid cell tiles.

11. The neuromorphic device of claim 10, wherein the controller is further configured to:

select the plurality of valid cell tiles based on the matching information.

12. The neuromorphic device of claim 10, wherein weights of at least two of the plurality of layers are digitally converted with different precisions and are stored in at least two of the plurality of valid cell tiles, and wherein the layer buffer is further configured to store precision information applied to each of the plurality of layers.

13. The neuromorphic device of claim 10, wherein the layer buffer is further configured to store, as the matching information, position information of each of the plurality of first tile groups, and offset information based on a number of bit digits of the input data input to each of the plurality of first tile groups.

14. The neuromorphic device of claim 1, wherein a number of the plurality of first tile groups is equal to or less than a number of bit digits of the input data.

15. A neuromorphic device comprising:

a plurality of cell tiles, each of the plurality of cell tiles comprising:

a cell array comprising a plurality of memory cells, a row driver connected to the plurality of memory cells through a plurality of row lines, and cell analog-to-digital converters ADCs connected to the plurality of memory cells through a plurality of column lines and configured to convert cell currents read through the plurality of column lines into digital cell data;

a controller configured to:

define a plurality of first tile groups respectively comprising at least two of the plurality of cell tiles, and store, in each of the plurality of first tile groups, weights of a first layer included in a trained neural network based on the weights of the first layer being received;

a layer buffer configured to receive, from the controller, and store matching information of the plurality of first tile groups, precision information of input data input to the first layer, and precision information of the weights of the first layer; and a plurality of offset shifters configured to execute a multiplication operation on the digital cell data output from each of the plurality of cell tiles.

16. The neuromorphic device of claim 15, wherein the input data input to the first layer is N-bit data, N being a natural number of 2 or more, and wherein the controller is further configured to:

input at least two lower bits of the N-bit data to cell tiles included in a first tile group of the plurality of first tile groups, and input remaining upper bits of the N-bit data to cell tiles included in a second tile group of the plurality of first tile groups.

17. The neuromorphic device of claim 15, wherein the input data input to the first layer is N-bit data, N being a natural number of 3 or more, wherein a number of the plurality of first tile groups is N, and wherein the controller is further configured to:

divide the input data by 1 bit, and input the input data to the plurality of first tile groups by 1 bit.

18. A neuromorphic device comprising:

a plurality of cell tiles, each of the plurality of cell tiles comprising:

a cell array comprising a plurality of memory cells storing weights of a neural network, a row driver connected to the plurality of memory cells through a plurality of row lines, and cell analog-to-digital converters ADCs connected to the plurality of memory cells through a plurality of column lines and configured to convert cell currents read through the plurality of column lines into digital cell data;

a layer buffer configured to store matching information between a plurality of layers included in the neural network and a plurality of valid cell tiles of the plurality of cell tiles storing the weights; and a controller configured to:

select the plurality of valid cell tiles among the plurality of cell tiles based on the matching information, and execute a neural network-based arithmetic operation based on the plurality of valid cell tiles.

19. The neuromorphic device of claim 18, wherein the neural network comprises a first layer and a second layer sequentially arranged between an input layer and an output layer, wherein the plurality of valid cell tiles comprises a plurality of first valid cell tiles storing weights of the first layer, and a plurality of second valid cell tiles storing weights of the second layer, and wherein the layer buffer is further configured to store, as the matching information, position information of the plurality of first valid cell tiles and position information of the plurality of second valid cell tiles.

20. The neuromorphic device of claim 19, wherein a number of the plurality of first valid cell tiles is different from a number of the plurality of second valid cell tiles.

* * * * *